United States Patent
Ohashi et al.

(10) Patent No.: US 9,981,661 B2
(45) Date of Patent: May 29, 2018

(54) SADDLED VEHICLE

(71) Applicant: KABUSHIKI KAISHA F.C.C., Hamamatsu-shi (JP)

(72) Inventors: Tatsuyuki Ohashi, Hamamatsu (JP); Kazuyoshi Miyachi, Hamamatsu (JP); Shouji Makita, Hamamatsu (JP); Ryouhei Chiba, Hamamatsu (JP); Kaoru Iida, Hamamatsu (JP); Makoto Sato, Hamamatsu (JP)

(73) Assignee: KABUSHIKI KAISHA F.C.C., Hamamatsu-shi (JP)

( * ) Notice: Subject to any disclaimer, the term of this patent is extended or adjusted under 35 U.S.C. 154(b) by 6 days.

(21) Appl. No.: 15/217,500

(22) Filed: Jul. 22, 2016

(65) Prior Publication Data
US 2017/0057513 A1 Mar. 2, 2017

Related U.S. Application Data

(63) Continuation of application No. PCT/JP2014/051397, filed on Jan. 23, 2014.

(51) Int. Cl.
*B60W 10/10* (2012.01)
*B60W 10/184* (2012.01)
(Continued)

(52) U.S. Cl.
CPC ..... *B60W 30/18009* (2013.01); *B60T 8/1706* (2013.01); *B60T 8/261* (2013.01);
(Continued)

(58) Field of Classification Search
CPC ............... B60W 10/10; B60W 10/184; B60W 30/18009; B60W 30/18109; B60W 50/12;
(Continued)

(56) References Cited

U.S. PATENT DOCUMENTS

2005/0168059 A1* 8/2005 Nishikawa .............. B60T 8/261 303/3
2009/0326773 A1* 12/2009 Cress ...................... B60T 7/122 701/70

(Continued)

FOREIGN PATENT DOCUMENTS

| EP | 1842755 A1 | 10/2007 |
|----|------------|---------|
| EP | 2159095 A2 | 3/2010 |

(Continued)

OTHER PUBLICATIONS

Extended Search Report received in European Patent Application No. 14879639.4, dated Jul. 11, 2017 in 9 pages.

*Primary Examiner* — Edwin A Young
(74) *Attorney, Agent, or Firm* — Knobbe, Martens, Olson & Bear, LLP

(57) ABSTRACT

A saddled vehicle can comprise a handlebar on tip ends of which are provided a grasping grip to be grasped by a driver and a throttle grip for an accelerator operation, a first brake device and a second brake device for performing a braking operations. The vehicle can also include a gradient detector for detecting a road gradient during travel of the vehicle, and a deceleration adjustment device for automatically adjusting the deceleration of the vehicle in accordance with the road gradient detected by the gradient detection device and operation conditions of the first brake device and the second brake device.

19 Claims, 17 Drawing Sheets

(51) Int. Cl.
*B60W 30/18* (2012.01)
*B60T 8/17* (2006.01)
*B60W 50/12* (2012.01)
*B62K 11/14* (2006.01)
*B62K 23/04* (2006.01)
*B60T 8/26* (2006.01)
*B60T 8/32* (2006.01)

(52) U.S. Cl.
CPC ............ *B60T 8/3225* (2013.01); *B60W 10/10* (2013.01); *B60W 10/184* (2013.01); *B60W 50/12* (2013.01); *B62K 11/14* (2013.01); *B62K 23/04* (2013.01); *B60W 2550/142* (2013.01); *B60W 2710/1005* (2013.01); *B60W 2710/18* (2013.01); *B60Y 2200/12* (2013.01)

(58) Field of Classification Search
CPC ... B60W 2550/142; B60W 2710/1005; B60W 2710/18
See application file for complete search history.

(56) References Cited

U.S. PATENT DOCUMENTS

| | | |
|---|---|---|
| 2012/0022750 A1 | 1/2012 | Matsuda |
| 2013/0103280 A1* | 4/2013 | Roll ..................... B60T 8/172 701/74 |

FOREIGN PATENT DOCUMENTS

| | | |
|---|---|---|
| EP | 2159400 A1 | 3/2010 |
| JP | H02-102969 | 4/1990 |
| JP | 2007-239809 | 9/2007 |
| JP | 2007-239810 | 9/2007 |
| JP | 2009-058068 | 3/2009 |
| JP | 2009-156448 | 7/2009 |
| JP | 2012-172595 | 9/2012 |

* cited by examiner

[Fig 1]
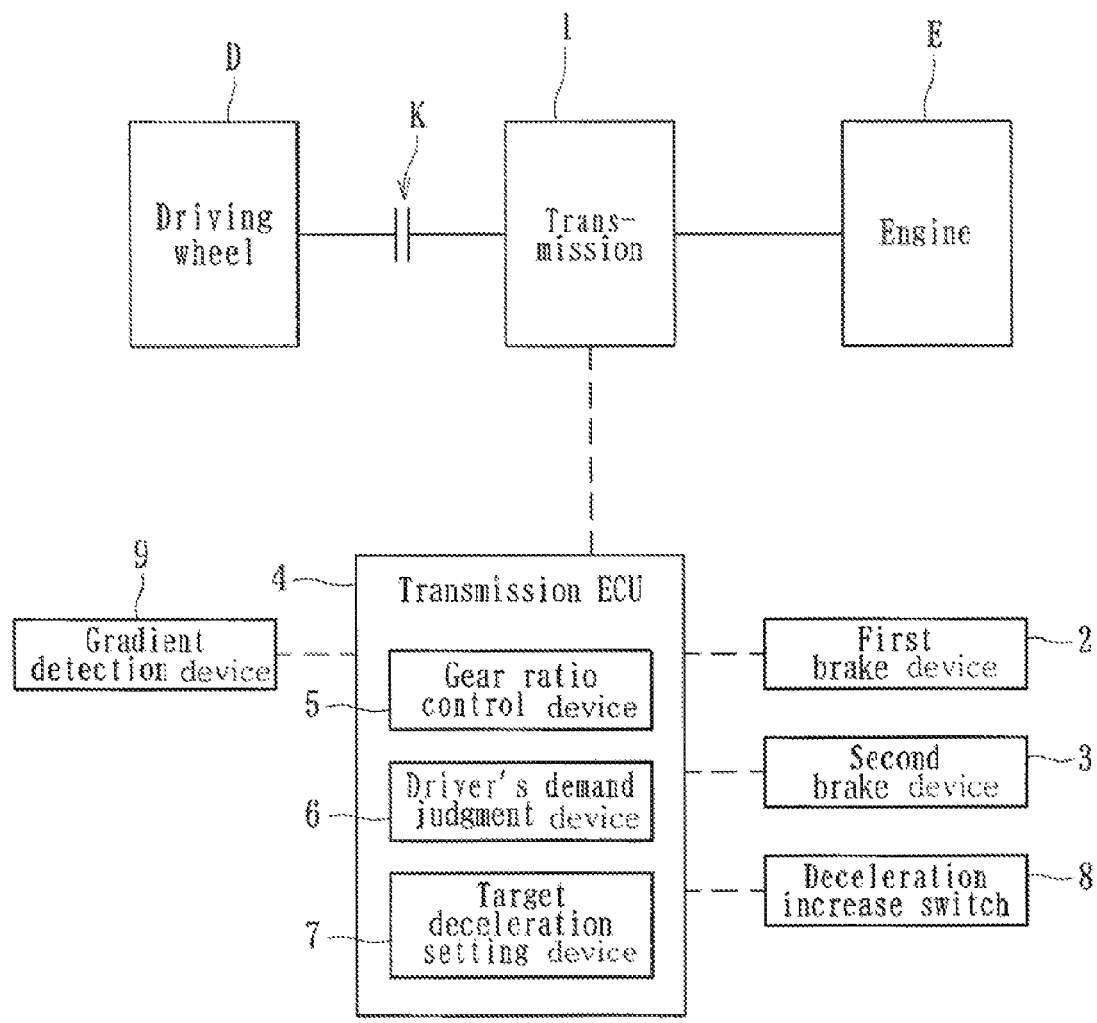

[Fig 2]
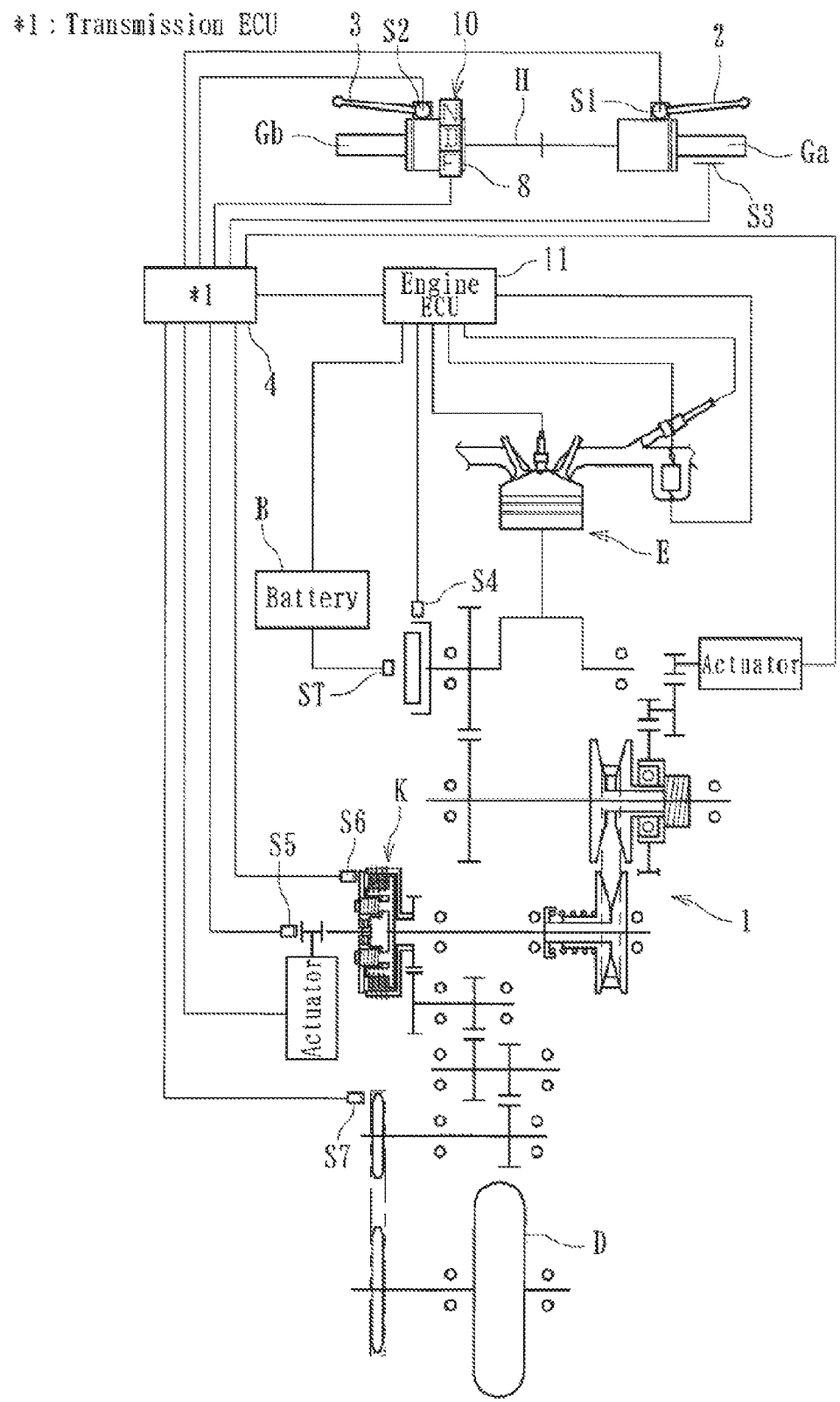

[Fig 3]
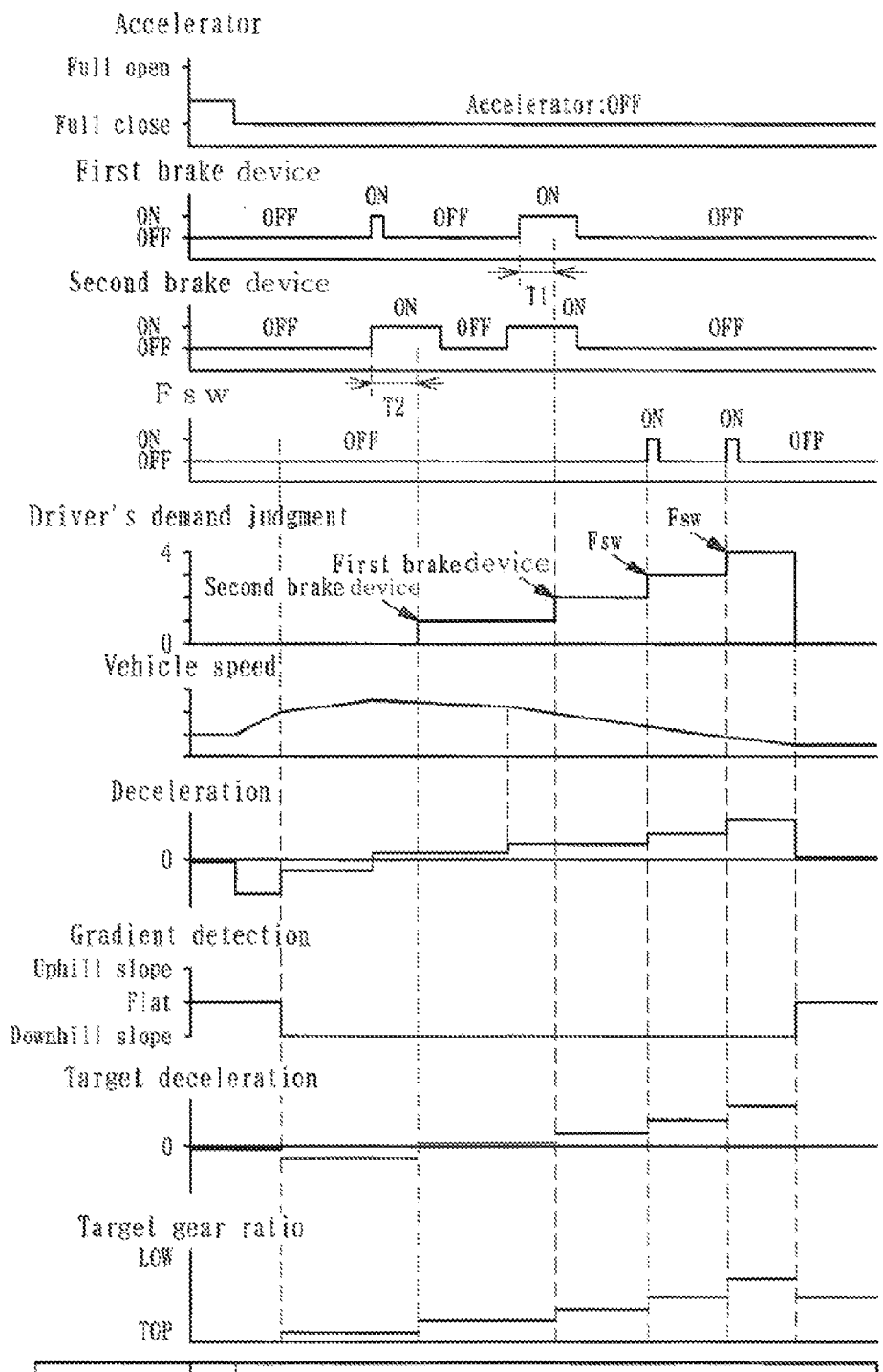

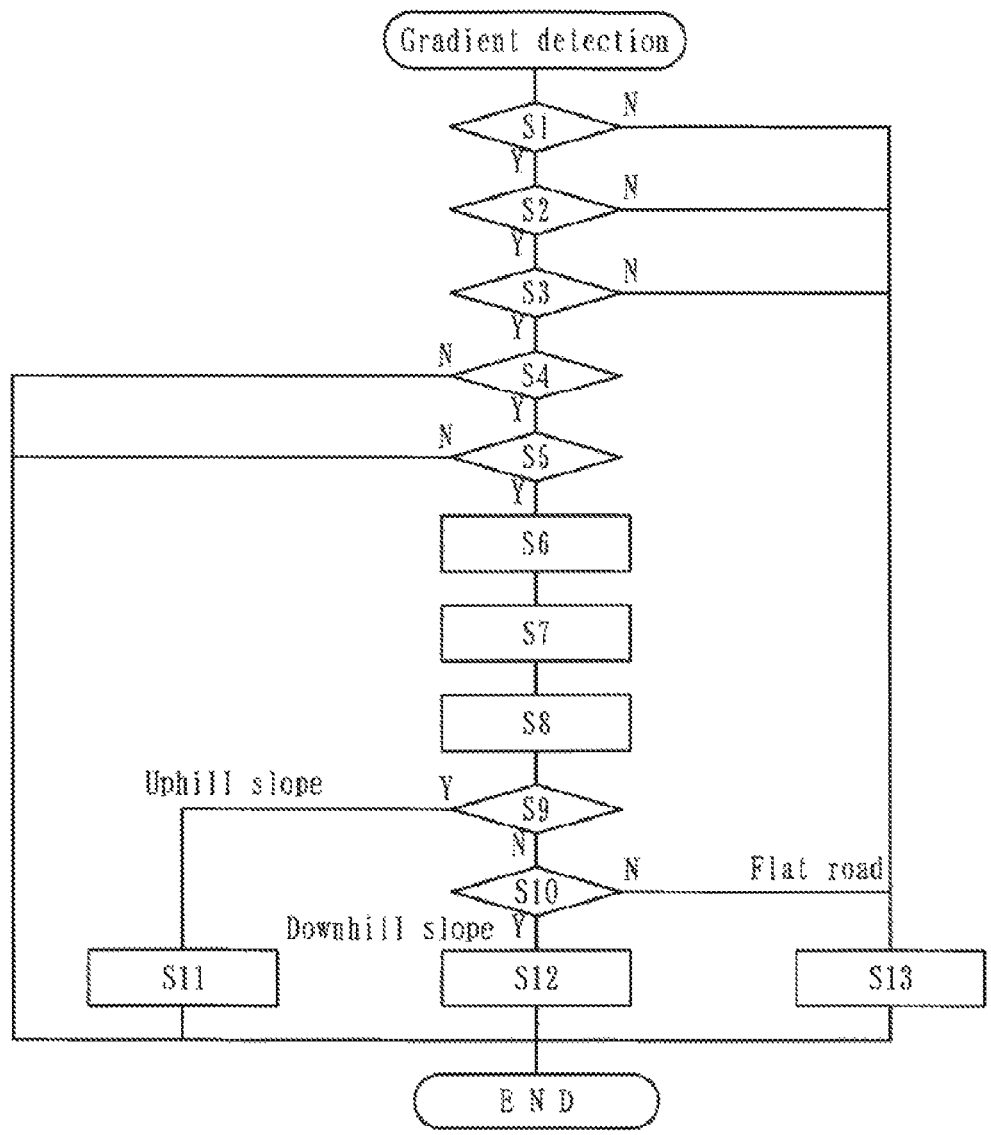
[Fig 4]

[Fig 5]
(a)
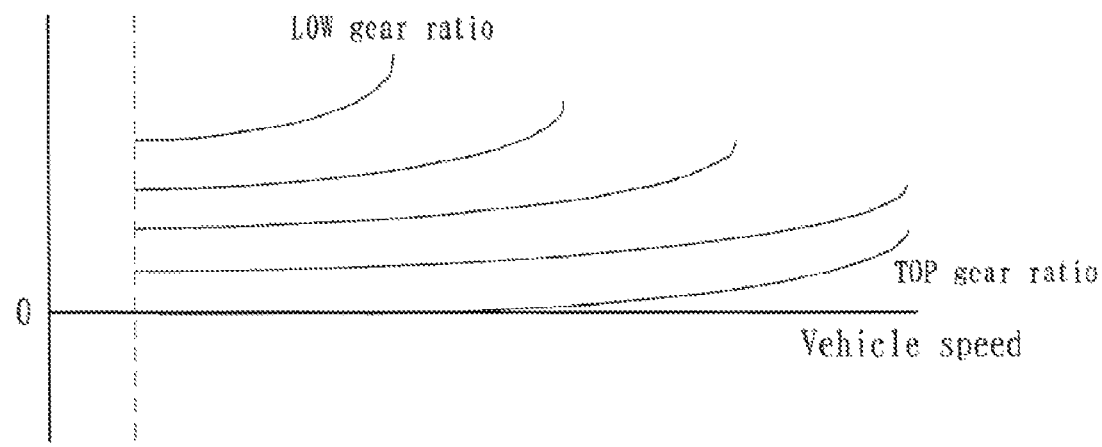
(b)
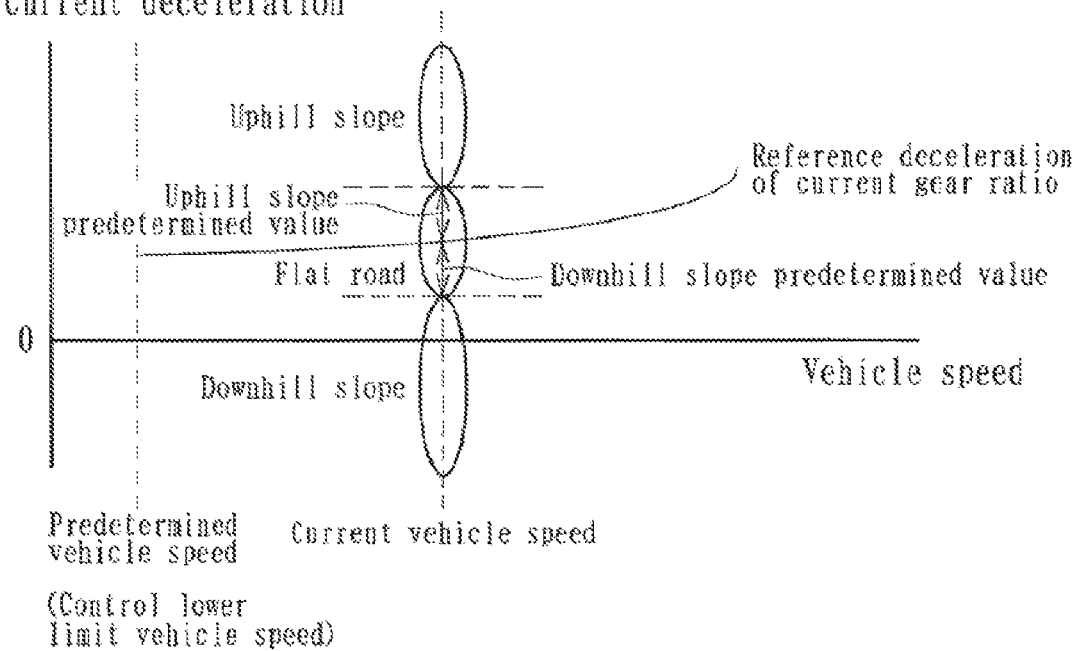

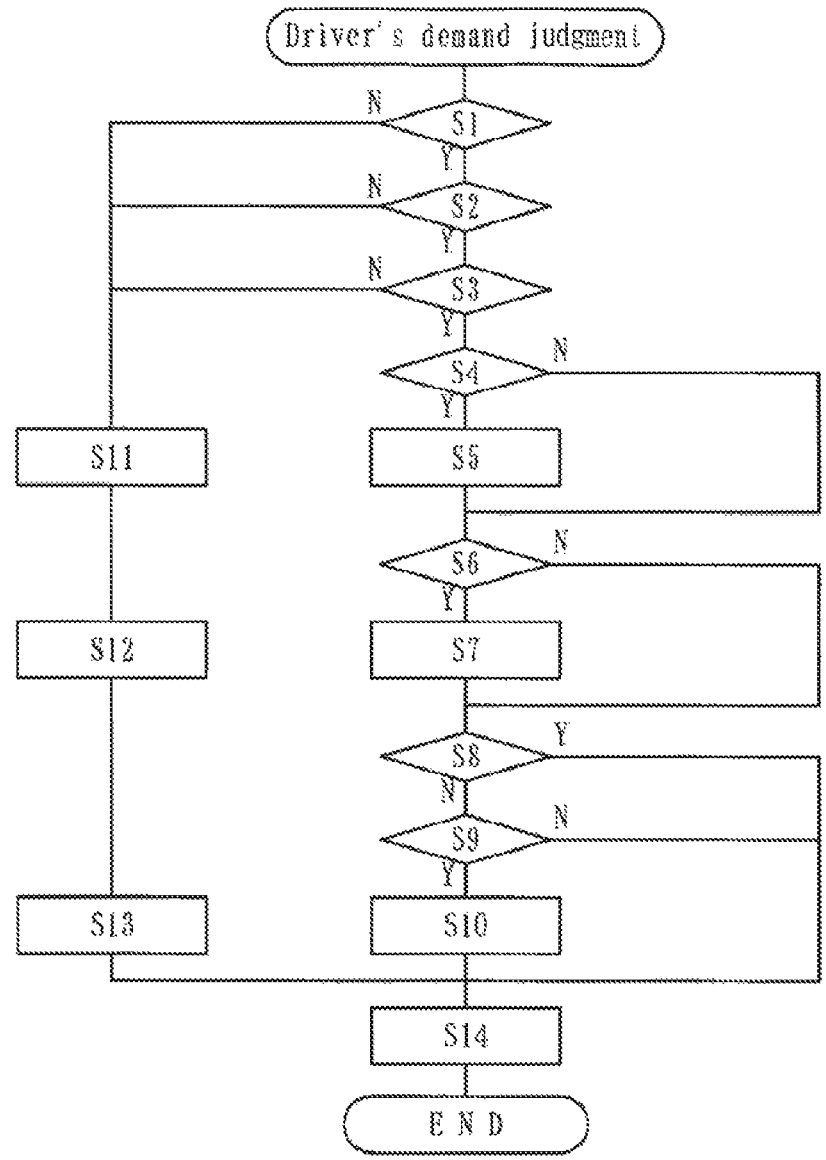
[Fig 6]

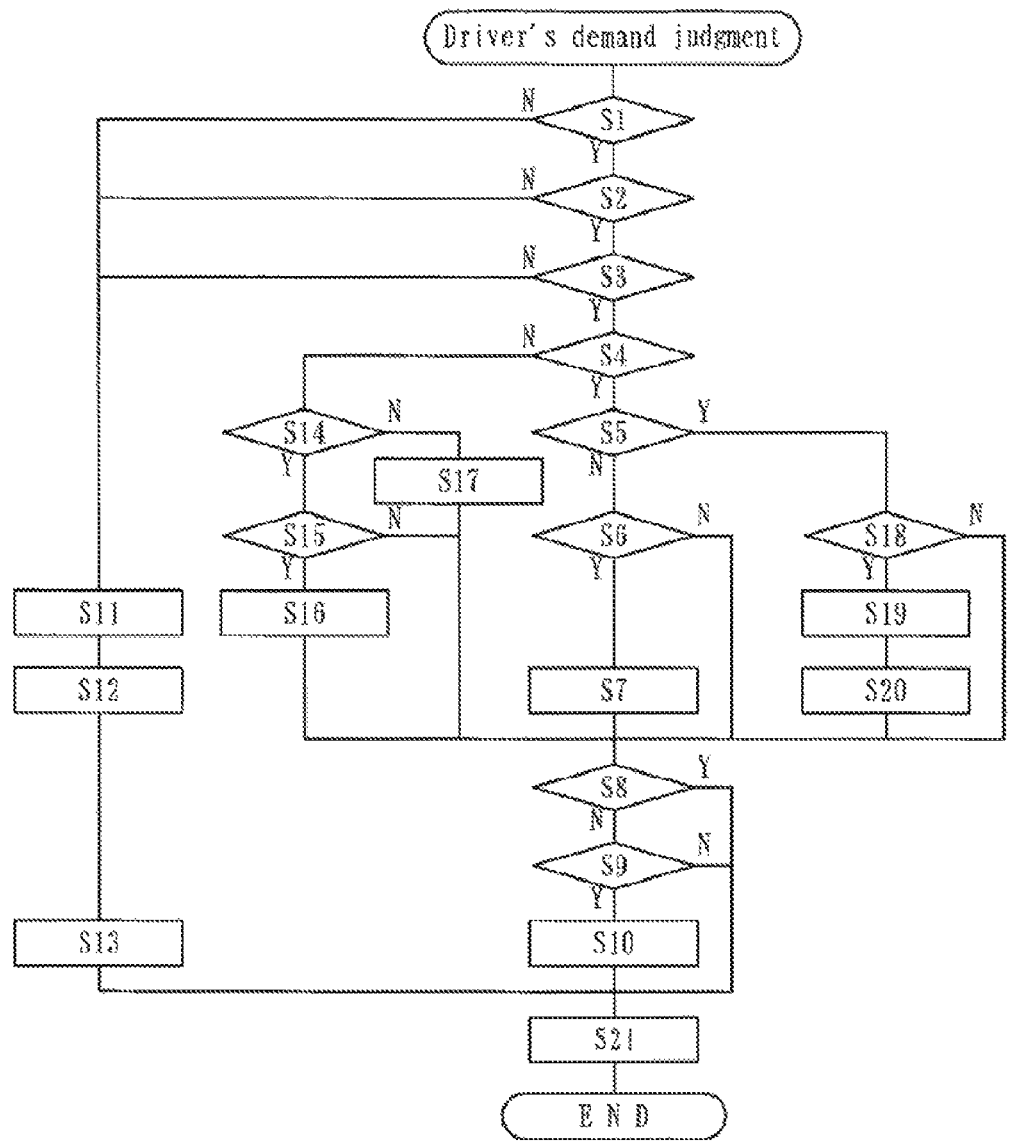
[Fig 7]

[Fig 8]
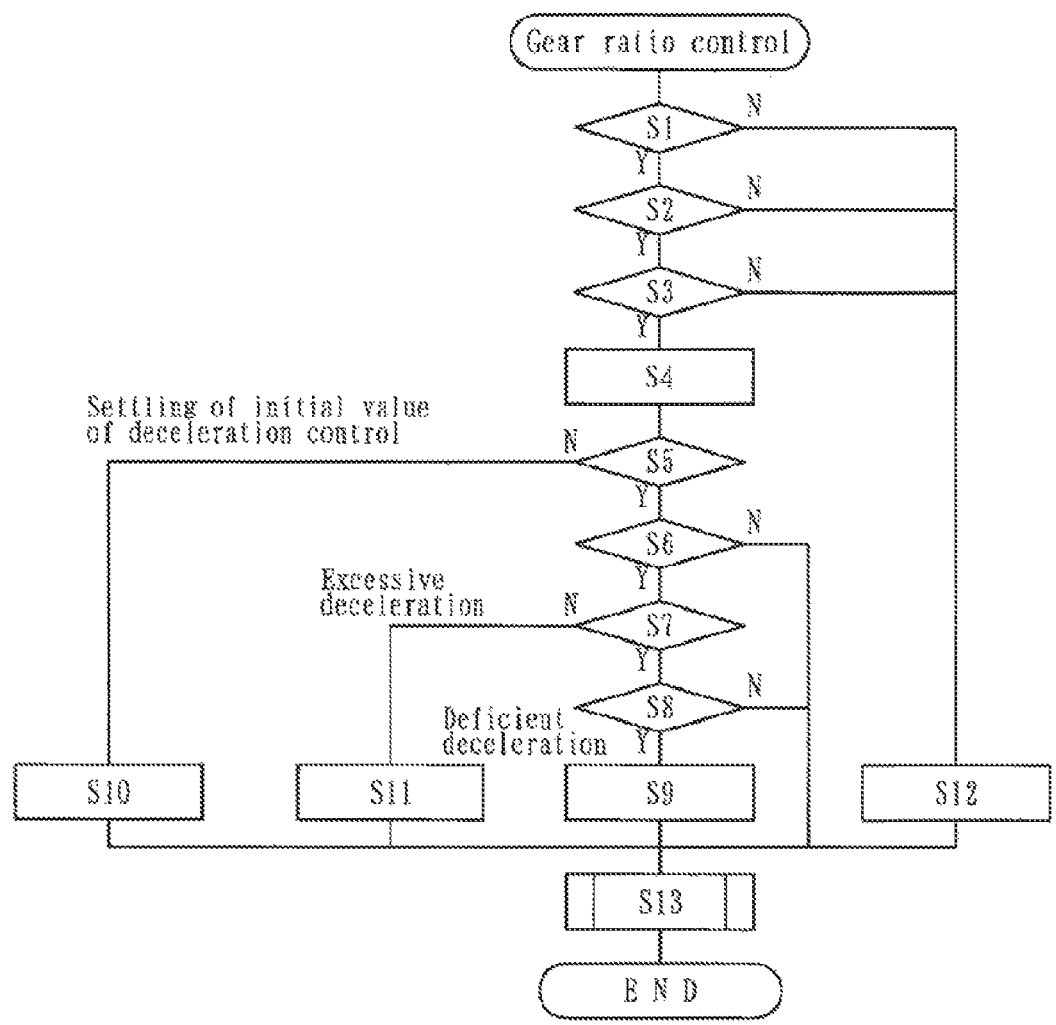

[Fig 9]
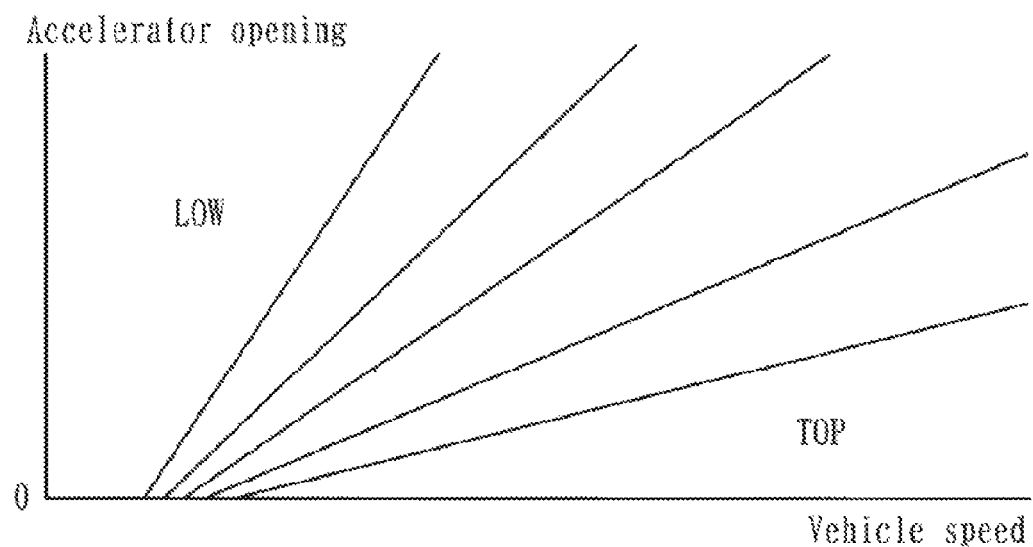
[Fig 10]
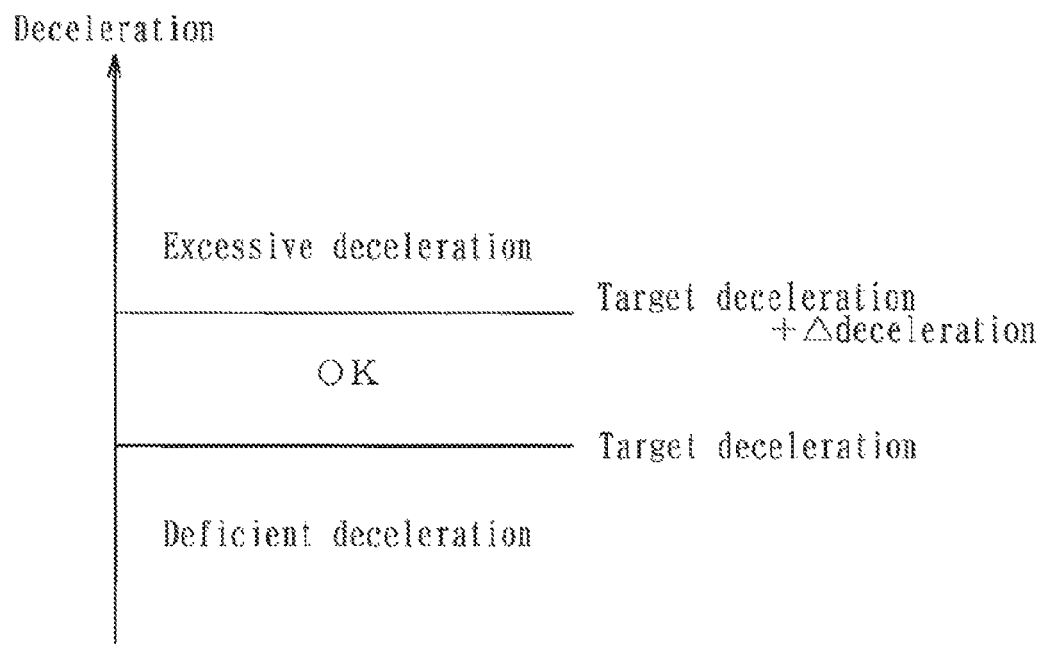

[Fig 11]
(a)
Target deceleration on flat road
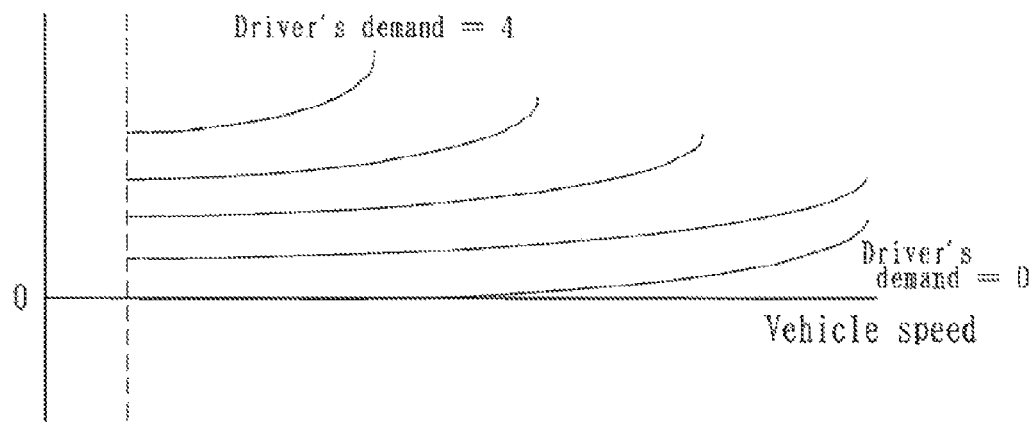
(b)
Target deceleration on uphill slope
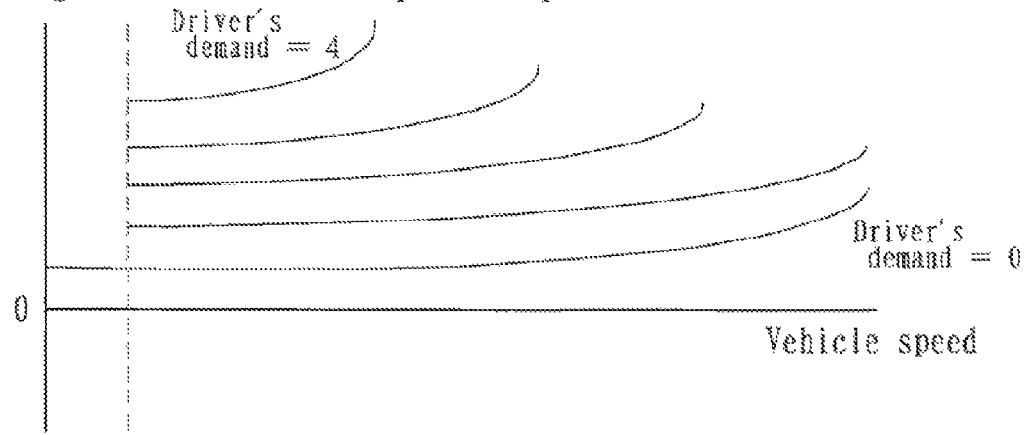
(c)
Target deceleration on downhill slope
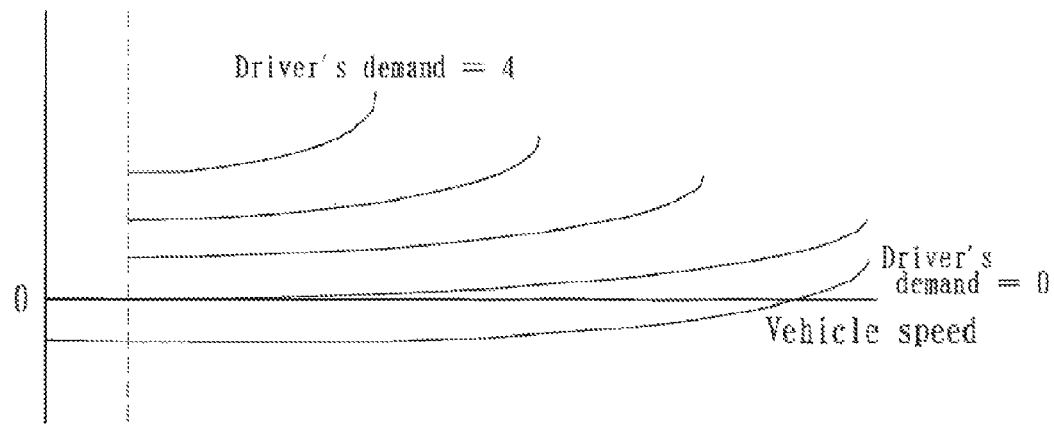

[Fig 12]
(a)
Target deceleration on flat road
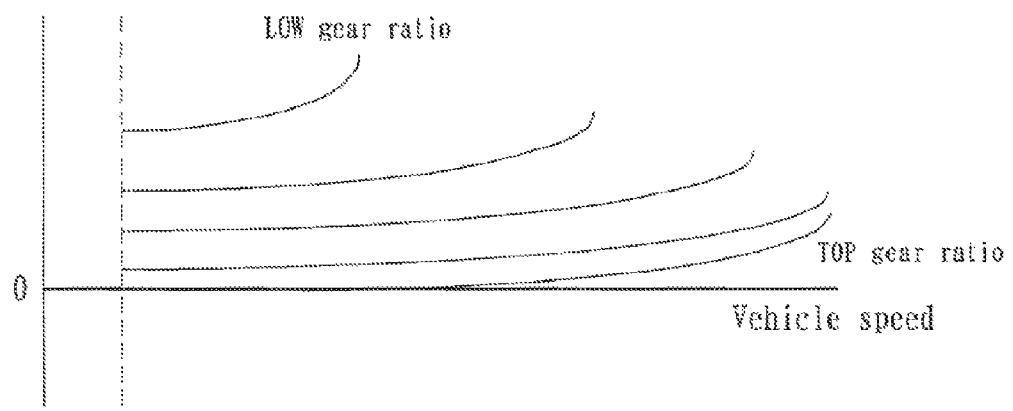
(b)
Target deceleration on uphill slope
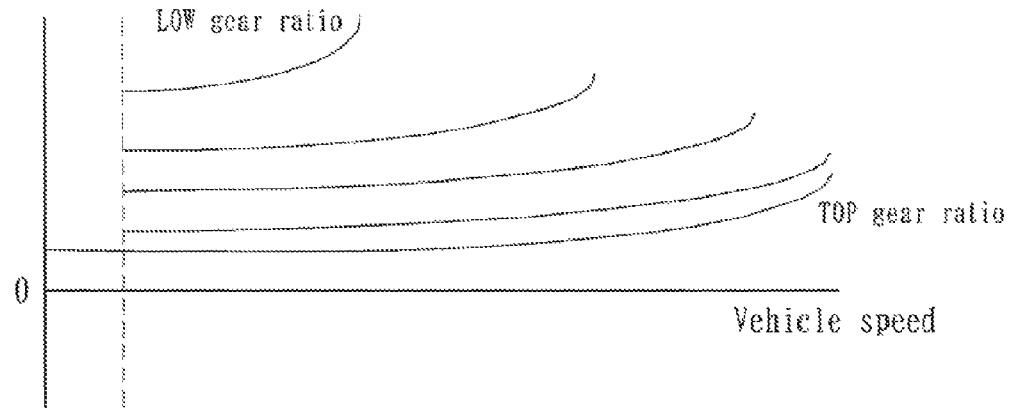
(c)
Target deceleration on downhill slope
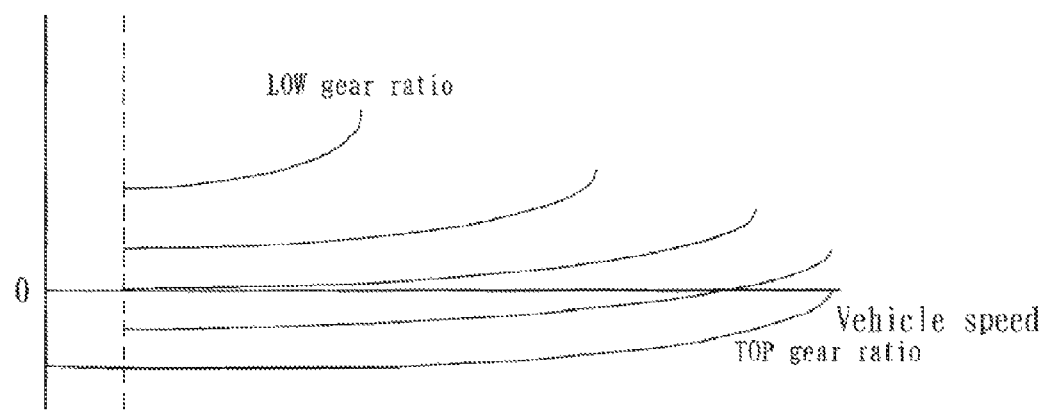

[Fig 13]
(a)
Target deceleration on flat road
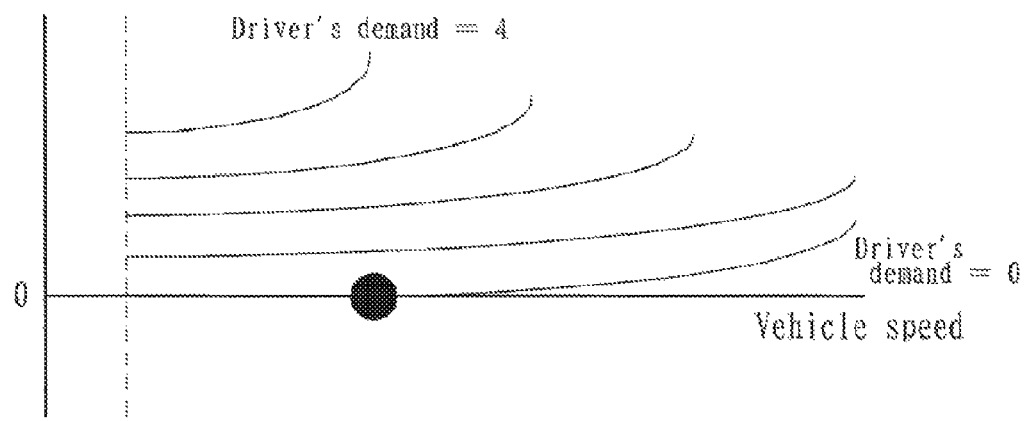
(b)
Target deceleration on uphill slope
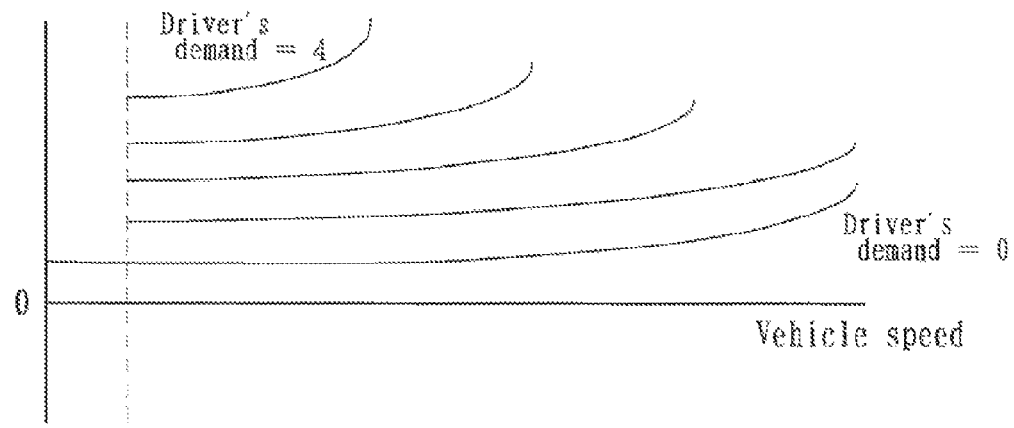
(c)
Target deceleration on downhill slope
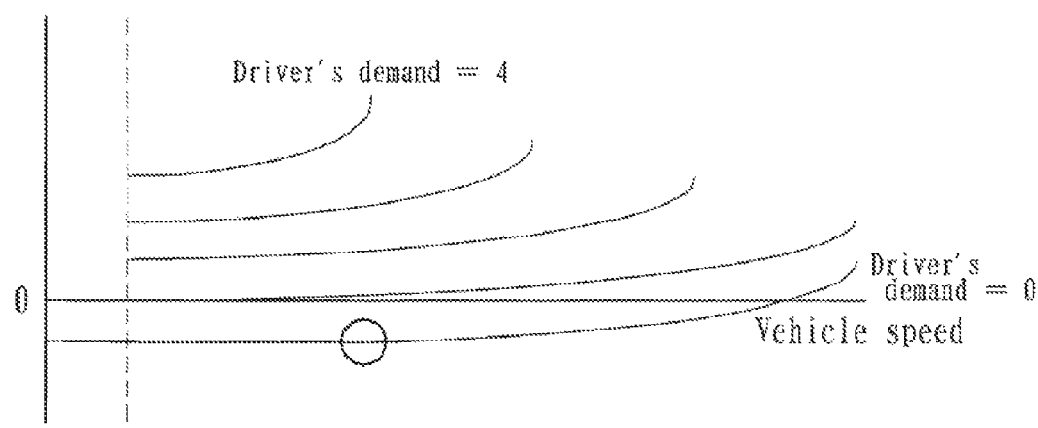

[Fig. 14]
(a)
Target deceleration on flat road
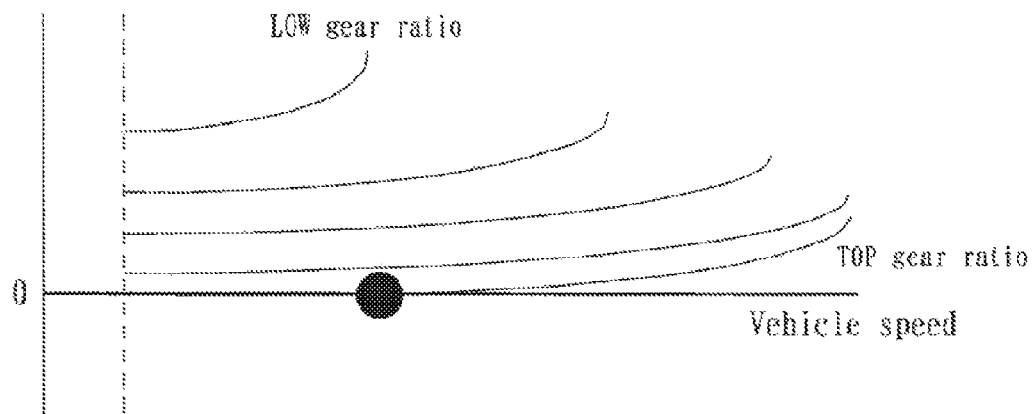
(b)
Target deceleration on uphill slope
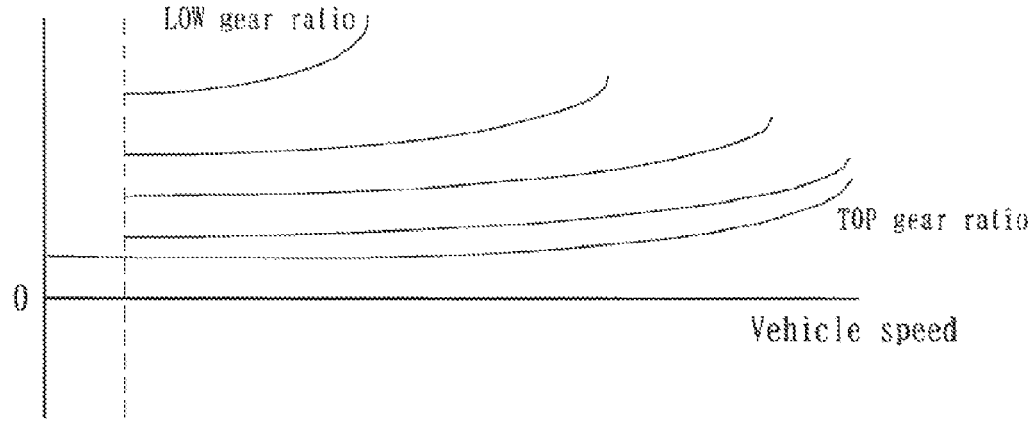
(c)
Target deceleration on downhill slope
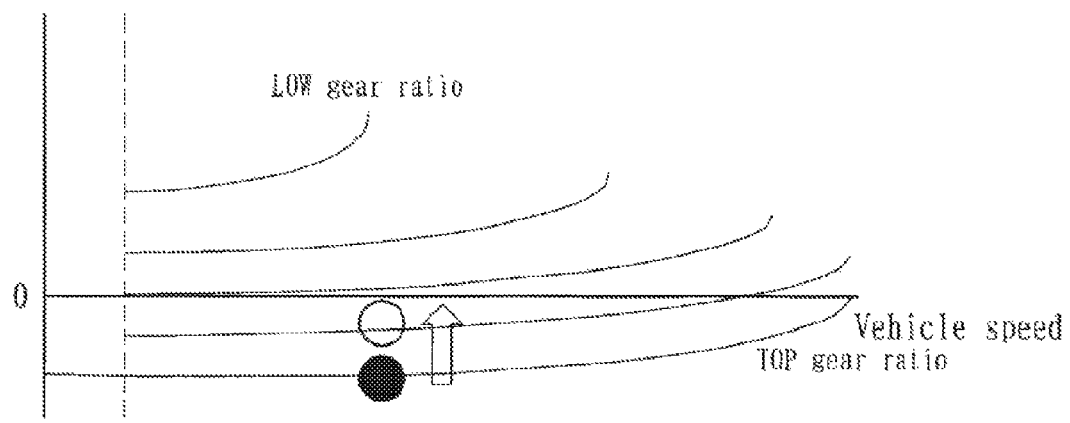

[Fig 15]
(a)
Target deceleration on flat road
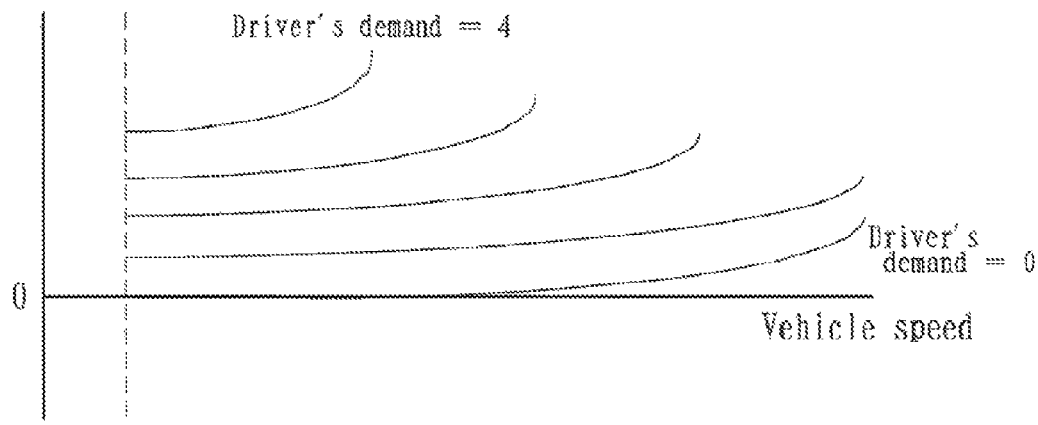
(b)
Target deceleration on uphill slope
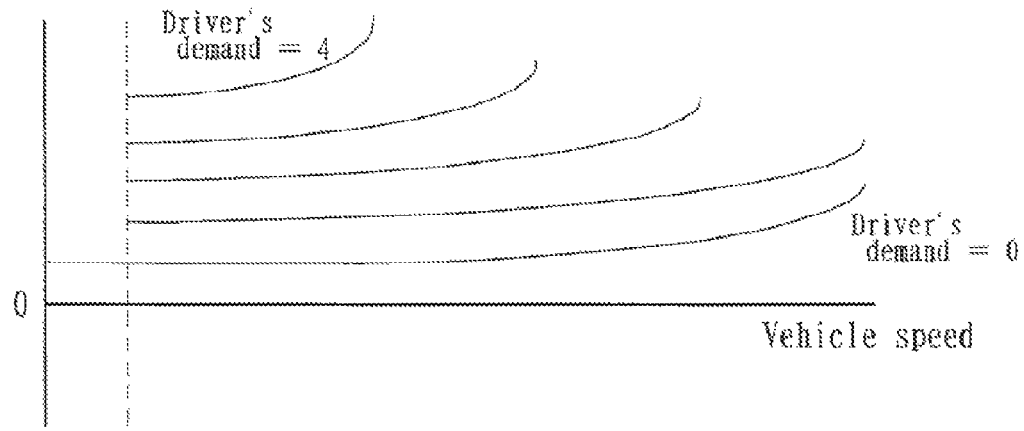
(c)
Target deceleration on downhill slope
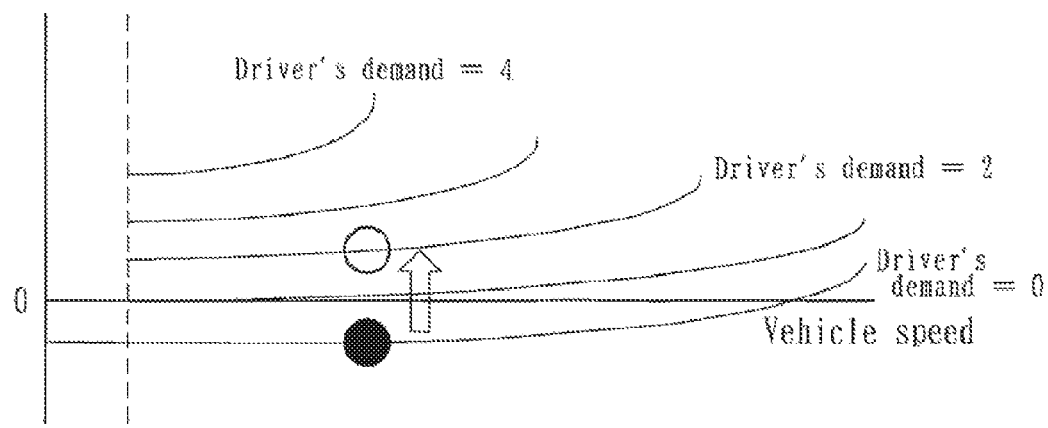

[Fig 16]
(a)
Target deceleration on flat road
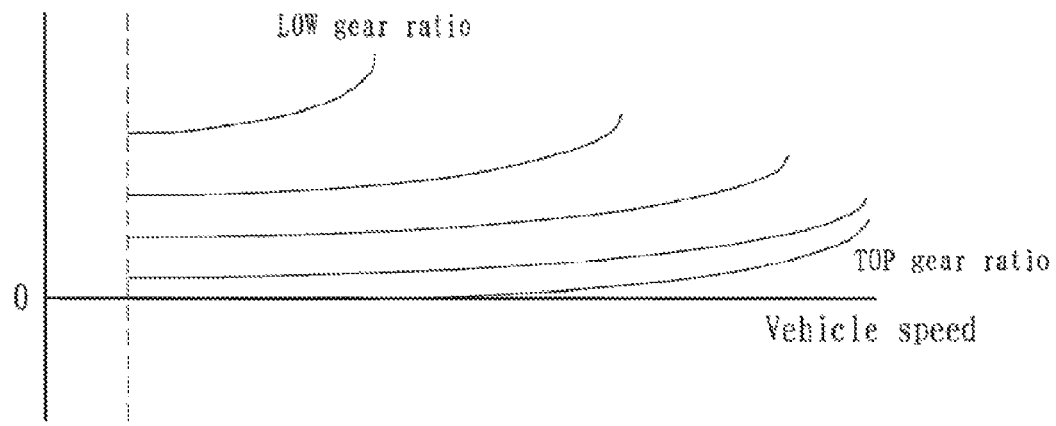
(b)
Target deceleration on uphill slope
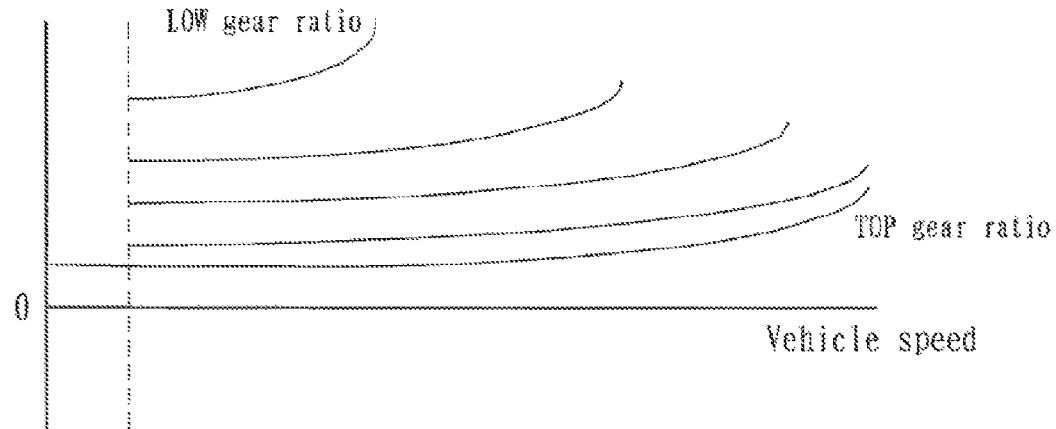
(c)
Target deceleration on downhill slope
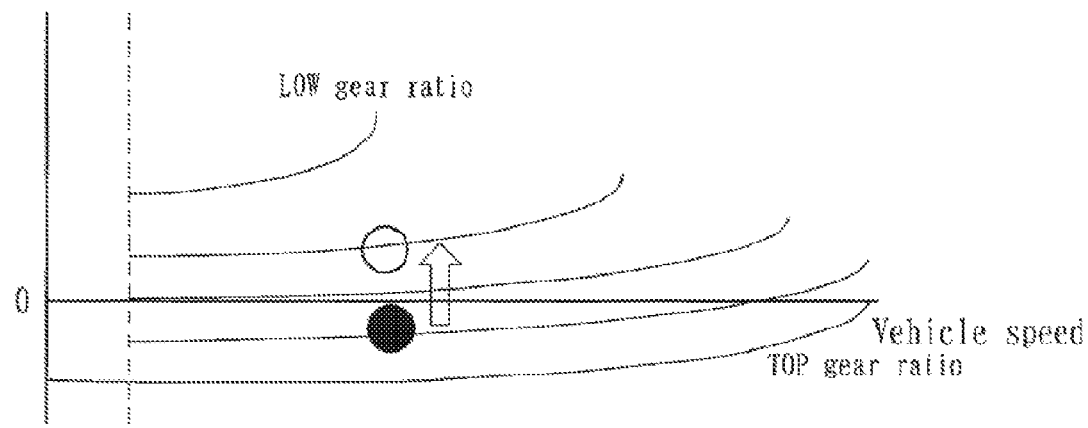

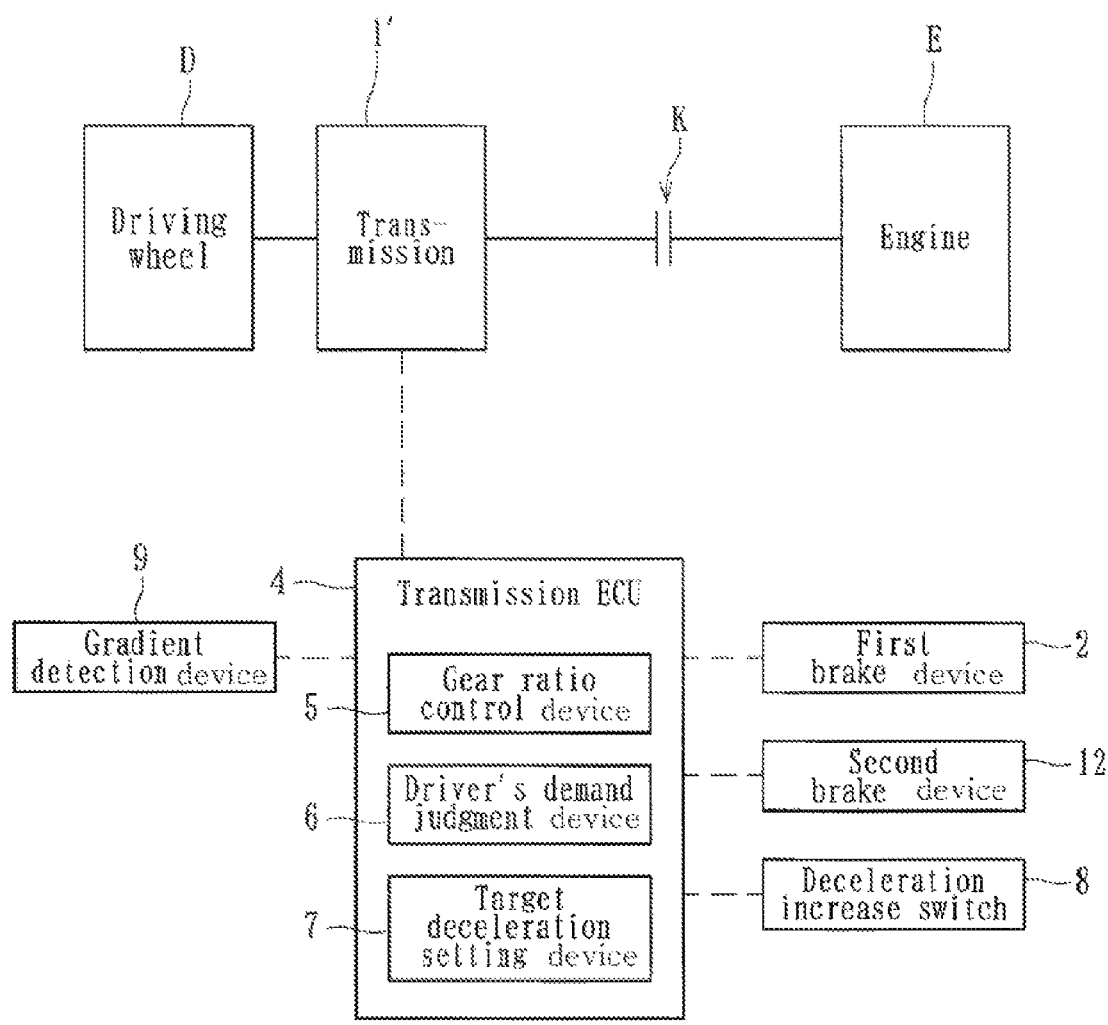
[Fig 17]

[Fig 18]
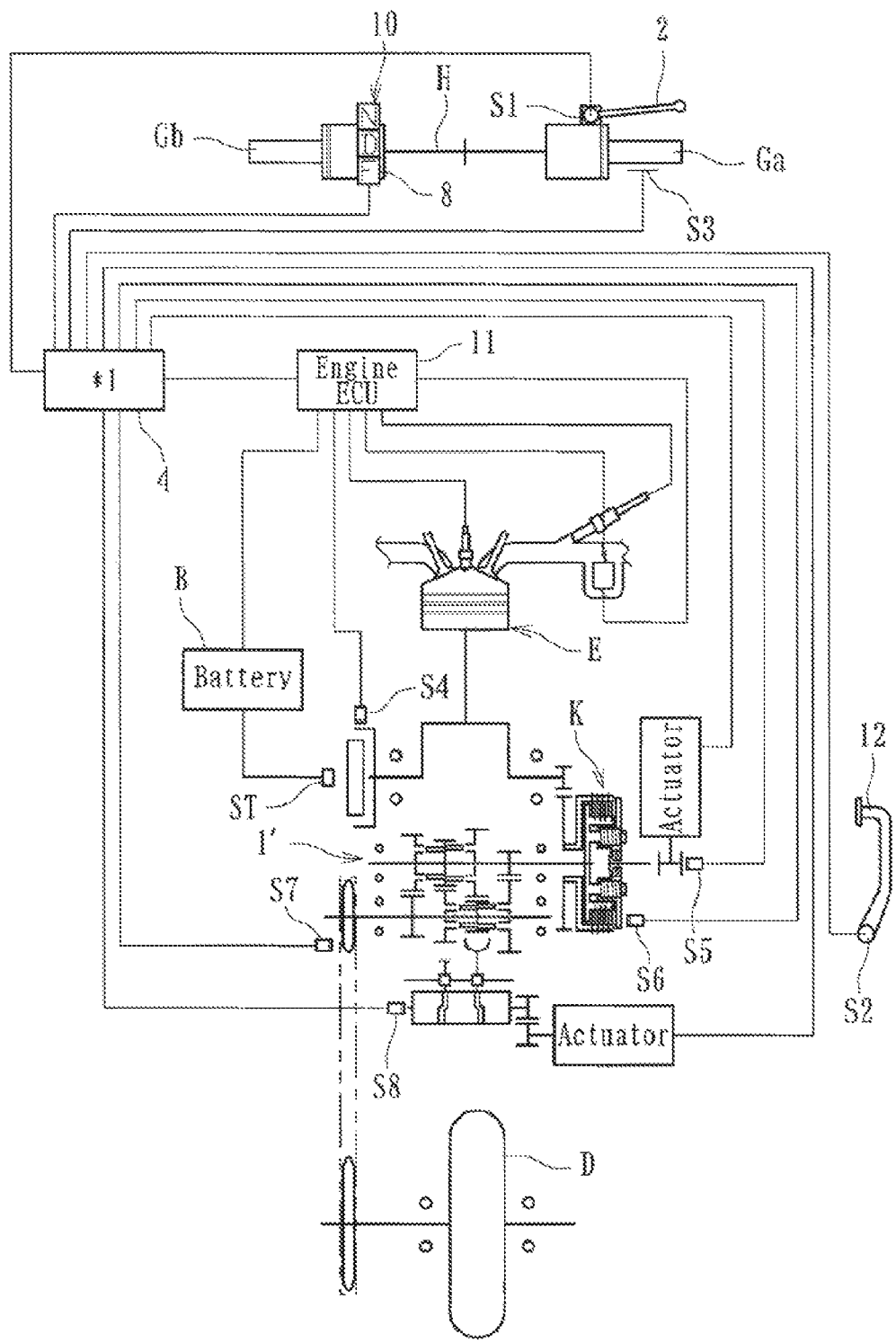

500
SADDLED VEHICLE

BACKGROUND OF THE INVENTIONS

Field of the Inventions

The present inventions relate to saddled vehicles such as those driven by a driver sitting on a saddle-type seat of the vehicle and steering with a bar-type steering handle.

Description of the Related Art

In two-wheeled vehicles such as motor scooters or motorcycles equipped with a transmission having an automatic gear ratio control mode, it can be difficult for a driver to apply engine braking at an intended timing when travelling in an automatic gear ratio control mode. Accordingly, in some such vehicles, it can be necessary for the driver to apply the engine brake by manually switching a transmission to a lower gear ratio after switching to the manual gear ratio control mode. In such vehicles, such requirements can cause inconveniences in operation and thus inferiority in operability because of the necessity to switch to a manual gear ratio control mode before applying the desired engine braking.

To solve the above drawbacks, Patent Document JP 2009-156448 A describes a two-wheeled vehicle which can shift-down at least two gear steps or more when a driver's intention is input through an operation means in order to apply engine braking without the need to manually switch from an automatic to a manual gear change mode. More particularly, in the two-wheeled vehicle of the prior art noted above, the transmission can be shifted to a pseudo manual gear ratio control mode by performing operational input of the brake lever and the throttle grip in which the manual gear ratio control can be attained by performing a predetermined operational input of the throttle grip under the pseudo manual gear ratio control mode.

In addition, technology for changing a gear ratio in accordance with operational conditions of two brake devices is disclosed in Patent Document JP 02-102969 A. According to this prior art, it is possible to instantaneously apply engine braking by performing shift-down with operation of the two brake devices.

SUMMARY OF THE INVENTIONS

An aspect of at least one of the inventions disclosed herein includes the realization that the system described in Patent Document JP 2009-156448 A, although the existing brake and throttle grip are able to shift the transmission to the manual gear ratio control mode (pseudo manual gear ratio control mode) and thus it is unnecessary to provide a separate dedicated operation means for shifting to the manual gear ratio control mode, it is a problem that a special operation for applying engine brake separate from operations for driving the two-wheeled vehicle is required. This is because that the driver's gear ratio control intention is distinctively judged by combining the input of a predetermined throttle operation pattern and presence or absence of the brake input.

Another aspect of at least one of the inventions disclosed herein includes the realization that the system described in Patent Document JP 02-102969 A, suffers from a problem in that the driver's expected deceleration is not always achieved during travel on a flat road after travel on a long steep downhill slope when attempting to apply engine braking at a large gear ratio. For example, although the system described in Patent Document JP 02-102969 A is able to instantaneously apply engine braking by performing shift-down with the brake operation, it is so controlled when travelling on a long steep downhill slope that the vehicle can travel without brake fade (reduction of braking force) while applying engine braking at a large gear ratio so as to prevent the vehicle from being accelerated. However, if such a control is performed while travelling down a long steep downhill slope and then on a flat road, the deceleration would become too much (over-braking) during travel over the flat road portion and would not correspond to the driver's expected deceleration.

Thus, in some embodiments, a saddled vehicle can apply engine braking while travelling in an automatic gear ratio control in accordance with the driver' demand without the need for a separate dedicated operation means and a separate special operation for applying the engine brake.

In some embodiments, a saddled vehicle with a steering bar handle can comprise a bar handle on both tip ends of which are provided with a grasping grip to be grasped by a driver and a throttle grip for an accelerator operation; a first brake means and a second brake means including two operation means for performing a braking operation, at least one of which being mounted on the tip end of the bar handle; a gradient detection means for detecting a road gradient during travel of a vehicle; and a deceleration adjustment means for automatically adjusting the deceleration of the vehicle in accordance with the road gradient detected by the gradient detection means characterized in that the saddled vehicle further comprises a driver's demand judgment means for judging the deceleration of the vehicle demanded by the driver in accordance with operation conditions of the first brake means and the second brake means and the road gradient detected by the gradient detection means, and that the deceleration adjustment means is able to control the vehicle on the basis of the deceleration judged by the driver's demand judgment means.

In some embodiments, the saddled vehicle further comprises a target deceleration setting means for setting a target deceleration on the basis of the deceleration judged by the driver's demand judgment means to control the vehicle as having the target deceleration set by the target deceleration setting means.

In some embodiments, the target deceleration setting means sets the target deceleration larger when both the first brake means and the second brake means are operated than when either one of the first brake means and the second brake means is operated.

In some embodiments, the target deceleration setting means does not perform setting or update of the target deceleration when an operation time of the first brake means or the second brake means is shorter than a predetermined time and performs setting of the target deceleration or increase of the set target deceleration on the basis of the deceleration judged by the driver's demand judgment means when an operation time of the first brake means or the second brake means is longer than the predetermined time.

In some embodiments, the first brake means is for braking a front wheel (or wheels and so on) and the second brake means is for braking a rear wheel, and wherein said predetermined time is set so that the time for operating the second brake means is longer than that for operating the first brake means.

In some embodiments, the target deceleration setting means does not perform setting or update of the target deceleration when the deceleration increased by the operation of the first brake means or the second brake means is smaller than a predetermined value and performs setting of the target deceleration or increase of the set target deceleration on the basis of the deceleration judged by the driver's demand judgment means when the deceleration increased by the operation of the first brake means or the second brake means is larger than the predetermined value.

In some embodiments, the first brake means is for braking a front wheel and the second brake means is for braking a rear wheel, and wherein said predetermined value is set so that the value for operating the second brake means is smaller than that for operating the first brake means.

In some embodiments, the saddled vehicle further comprises a deceleration increase switch for increasing the target deceleration set by the target deceleration setting means subject to a switch operation when the accelerator operation is not performed during travel of the vehicle.

In some embodiments, the target deceleration set by the target deceleration setting means is invalidated subject to the accelerator operation and a control based on the target deceleration is cancelled.

In some embodiments, the target deceleration set by the target deceleration setting means is maintained even if the operation of the first brake means or the second brake means is stopped.

In some embodiments, the target deceleration setting means sets a reduced target deceleration when a gradient detected by the gradient detecting means is a downgrade.

In some embodiments, the vehicle is controlled so as to have the target deceleration set by the target deceleration setting means by controlling the gear ratio of a transmission of the vehicle.

In some embodiments, the target deceleration to be set by the target deceleration setting means is set on the basis of a condition in which braking due to both the first brake means and the second brake means has not been performed.

In embodiments where the saddled vehicle comprises a driver's demand judgment means for judging the deceleration of the vehicle demanded by the driver in accordance with operation conditions of the first brake means and the second brake means and the vehicle can be controlled on the basis of the deceleration judged by the driver's demand judgment means, it is possible to obtain the driver's deceleration demand more accurately by properly using operations of the first brake means and the second brake means peculiar to the saddled vehicle as compared with two-wheeled vehicles provided with single brake means. In addition, since the driver's demand judgment means also judges the road gradient in operations of the first and second brake means, it is possible to further accurately obtain the driver's deceleration demand. Accordingly, it is possible to instantaneously apply the engine brake in accordance with driver's demand even if travelling under the automatic gear ratio control and also possible to dispense with a separate dedicate operation means and a separate special operation for applying the engine brake.

In embodiments where the saddled vehicle comprises a target deceleration setting means for setting a target deceleration on the basis of the deceleration judged by the driver's demand judgment means to control the vehicle as having the target deceleration set by the target deceleration setting means, it is possible to have the deceleration along the driver's demand.

In embodiments where the target deceleration setting means sets the target deceleration larger when both the first brake means and the second brake means are operated than when either one of the first brake means and the second brake means is operated, it is possible to have the deceleration further near the driver's demand.

In embodiments where the target deceleration setting means does not perform setting or update of the target deceleration when an operation time of the first brake means or the second brake means is shorter than a predetermined time and performs setting of the target deceleration or increase of the set target deceleration on the basis of the deceleration judged by the driver's demand judgment means when an operation time of the first brake means or the second brake means is longer than the predetermined time, it is possible to prevent the vehicle from being adjusted to a different deceleration from the driver's demand.

In embodiments where the first brake means is for braking a front wheel and the second brake means is for braking a rear wheel, and said predetermined time is set so that the time for operating the second brake means is longer than that for operating the first brake means, it is possible to more firmly prevent the vehicle from being adjusted to a different deceleration from the driver's demand.

In embodiments where the target deceleration setting means does not perform setting or update of the target deceleration when the deceleration increased by the operation of the first brake means or the second brake means is smaller than a predetermined value and performs setting of the target deceleration or increase of the set target deceleration on the basis of the deceleration judged by the driver's demand judgment means when the deceleration increased by the operation of the first brake means or the second brake means is larger than the predetermined value, it is possible to prevent the vehicle from being adjusted to a different deceleration from the driver's demand.

In embodiments where the first brake means is for braking a front wheel and the second brake means is for braking a rear wheel, and said predetermined value is set so that the value for operating the second brake means is smaller than that for operating the first brake means, it is possible to more firmly prevent the vehicle from being adjusted to a different deceleration from the driver's demand.

In embodiments where the saddled vehicle comprises a deceleration increase switch for increasing the target deceleration set by the target deceleration setting means subject to a switch operation when the accelerator operation is not performed during travel of the vehicle, it is possible to more suitably obtain the deceleration of driver's demand.

In embodiments where the target deceleration set by the target deceleration setting means is invalidated subject to the accelerator operation and a control based on the target deceleration is cancelled, it is possible to terminate the control based on the target deceleration by accelerator operation and to dispense with separate dedicate operation means and separate special operation.

In embodiments where the target deceleration set by the target deceleration setting means is maintained even if the operation of the first brake means or the second brake means is stopped, it is possible to more firmly obtain the deceleration of driver's demand.

In embodiments where the target deceleration setting means sets a reduced target deceleration when a gradient detected by the gradient detecting means is a downgrade, it is possible to prevent the vehicle from being adjusted to a different deceleration from the driver's demand during travel on a downgrade road.

In embodiments where the vehicle is controlled so as to have the target deceleration set by the target deceleration setting means by controlling the gear ratio of a transmission of the vehicle, it is possible to more accurately and rapidly obtain the target deceleration with applying the engine brake.

In embodiments where the target deceleration to be set by the target deceleration setting means is set on the basis of a condition in which braking due to both the first brake means and the second brake means has not been performed, it is possible to set the target deceleration of adjustment shared by the engine brake. Accordingly, this makes the adjustment control of engine brake easy since the target deceleration can be determined irrespective of presence or absence of braking by operation of the first brake means or the second brake means.

BRIEF DESCRIPTION OF THE DRAWINGS

FIG. 1—A block diagram of a saddled vehicle according to a first embodiment;

FIG. 2—A schematic view showing a general structure of the saddled vehicle of FIG. 1;

FIG. 3—A timing chart showing an operational mode in which a target deceleration is set by a target deceleration setting device during travel of the saddled vehicle;

FIG. 4—A flowchart showing a control operation for detecting a gradient by a gradient detection device of the saddled vehicle;

FIGS. 5a and 5b—Graphs showing a map for detecting a gradient with a gradient detection device of the saddled vehicle;

FIG. 6—A flowchart showing a control operation for judging the driver's demand deceleration of vehicle on the basis of the operation conditions of a first brake device, a second brake device and a deceleration increase switch;

FIG. 7—A flowchart showing another control operation for judging the driver's demand deceleration of vehicle on the basis of the operation conditions of the first brake device, the second brake device and the deceleration increase switch;

FIG. 8—A flowchart showing a control operation for obtaining the target deceleration based on the driver's demand deceleration of vehicle judged by detected results of the gradient and the driver's demand judgment device;

FIG. 9—A graph showing a ratio characteristic map for automatic gear ratio control of the saddled vehicle;

FIG. 10—A graph showing suitability of the deceleration relative to the target deceleration of the saddled vehicle;

FIGS. 11a, 11b, and 11c—Graphs showing maps for finding the target deceleration of the saddled vehicle;

FIG. 12a, 12b, 12c—Graphs showing maps for finding an initial ratio of the target deceleration of the saddled vehicle;

FIG. 13a, 13b, 13c—Graphs showing examples of cases (cases when traveling from a flat road to a downgrade road) for finding the target deceleration of the saddled vehicle;

FIG. 14a, 14b, 14c—Graphs showing examples of cases (cases when traveling from a flat road to a downgrade road) for finding the initial ratio of the target deceleration of the saddled vehicle;

FIG. 15a, 15b, 15c—Graphs showing examples of cases (cases when the first and second brakes are operated during travel at the downgrade) for finding the target deceleration of the saddled vehicle;

FIG. 16a, 16b, 16c—Graphs showing examples of cases (cases when the first and second brakes are operated during travel at the downgrade) for finding the initial ratio of the target deceleration of the saddled vehicle;

FIG. 17—A block diagram showing a concept of the saddled vehicle according to a second embodiment; and FIG. 18—A schematic view showing a general structure of the saddled vehicle of FIG. 17.

DETAILED DESCRIPTION OF THE PREFERRED EMBODIMENT

Embodiments of are described below in the context of saddled vehicle because the inventions disclosed herein have particular utility in that context. However, the inventions disclosed herein can be used in other contexts as well, including vehicles with more than two wheels, and other types of propulsion systems. A saddled vehicle of the first embodiment is shown as a two-wheeled vehicle designed to be driven by a driver sitting on a saddle seat and steering a bar handle, as shown FIGS. 1 and 2. The vehicle can include an engine E, a bar handle H, two operation devices for braking the vehicle comprising a first brake device 2 and a second brake device 3, both of which can be in the form of brake levers or other types of input devices and can be considered as serving first and second braking means 2, 3. The vehicle can also include a transmission 1 comprising a continuously variable transmission (CVT), a clutch K, an engine ECU 11 as an engine control means, a transmission ECU 4, and a gradient detection device 9 which can serve as a gradient detection means. A reference character "ST" denotes a starter for starting the engine E.

The bar handle H can be a bar-type steering handle one end of which is a grasping grip Gb adapted to be gripped by a driver's left hand and the other end of which is a throttle grip Ga gripped by a driver's right hand and rotated or twisted for accelerator operation. Thus, the throttle grip Ga can be twistably mounted to the bar handle H. A transmission range operating device 10 for changing the transmission 1 to a desired mode, which can be considered as serving as a transmission range operating means, is also mounted on the bar handle H at the base end position of the grasping grip Gb. Modes ("N" range and "D" range) of the transmission 1 can be selectively changed with a driver selectively operating the transmission range operating means 10 by his left hand grasping the grip Gb. The transmission range operating device 10 can be in the form of a three-position switch, or other type of user input device.

The transmission range operating means 10 of the present embodiment is provided with a deceleration increase switch (also referred to as "Fsw switch") 8. The deceleration increase switch 8 operates to increase a target deceleration set by a target deceleration setting means 7 described below, subject to switching operation when the accelerator operation (rotational operation of the throttle grip Ga) is not performed during travel of the vehicle. As used herein, the phrase "when the accelerator operation is not performed during travel of the vehicle" can be considered as when a driver of the vehicle is not twisting the throttle grip Ga, and thus the throttle grip Ga is positioned in an idle position toward which it may be biased under the force of a spring (not shown).

The throttle grip Ga can be grasped and operated by a driver with being rotated to open and close a throttle (controlling a flow of air and/or fuel to the engine with a throttle valve and/or a fuel injection valve) of the engine E and to supply the engine E with air/fuel mixtures to drive the engine E at a desired speed or power output. In addition, a switch case can be mounted on the bar handle H at a base end position of the throttle grip Ga for operating various electric parts of the vehicle.

The first brake device 2 (which can be considered as serving as a first brake means) can be mounted on the tip end of the bar handle H (extended from base end position of the throttle grip Ga). The first brake means 2 can comprise a lever swingably operated by a driver grasping the throttle grip Ga and can be configured to operate a front wheel brake of the vehicle (not shown) when the swing motion of the lever is detected by a brake operation detection sensor S1.

In addition, the second brake device 3 (which can be considered as serving as a second brake means) can be mounted on the tip end of the bar handle H (extended from base end position of the grasping grip Gb). Similarly to the first brake means 2, the second brake means 3 comprises a lever swingably operated by a driver grasping the grasping grip Gb and can be configured to operate a rear wheel brake of the vehicle (not shown) when the braking operation of the second brake means 3 is detected by a brake operation detection sensor S2.

The vehicle of the present embodiment further comprises a detection sensor S3 for detecting whether the throttle grip Ga is grasped and/or twisted beyond an idle position of the throttle grip Ga or not, an engine rotation sensor S4 and a vehicle speed sensor S7 for detecting a vehicle speed. These detection sensors S3, S7 are electrically connected to the transmission ECU 4 and can transmit detected signals to the transmission ECU 4 and the engine rotation sensor S4 is electrically connected to the engine ECU 11 and can transmit detected signals to the engine ECU 11.

The clutch K and the transmission 1 are arranged on the power transmitting path from the engine E to the driving wheel D. The transmission 1 of the present embodiment can comprise a CVT (continuously variable transmission) which can be configured to automatically change a gear ratio according to a mode set by the transmission range operating means 10. The transmission 1 is controlled by a gear ratio control means 5 and occupies a condition to transmit the driving power of the engine E to the driving wheel D when being set at "D" range and a condition not to transmit the driving power of the engine E to the driving wheel D by cutting off power transmission with having the clutch "OFF" at the "N" range (neutral range).

The clutch K can be in the form of a multiple disc clutch in this embodiment arranged on the power transmitting path between the transmission 1 and the driving wheel D and adapted to transmit and cut off the driving power of the engine E to the driving wheel D at selected timings. The clutch K can be switched between an "ON" state in which the driving power of the engine E is transmitted to the driving wheel D and an "OFF" state in which the driving power of the engine E cannot be transmitted to the driving wheel D.

The clutch K of the present embodiment is provided with a clutch position angle sensor S5 and a clutch rotation sensor S6 and detected signals from these sensors S5, S6 can be transmitted to the transmission ECU 4. The press-contacted condition of clutch discs can be grasped from the detected signals and thus can detect the torque capacity (TC) of the clutch K.

The engine ECU (Electronic Control Unit which an serve as an engine control means) 11 can comprise a microcomputer etc. for controlling the engine E supplied with electric power from a battery B of vehicle and electrically connected to the transmission ECU 4 for transmitting and receiving electric signals therebetween. The engine ECU 11 of the present embodiment can perform an idle-stop operation in which the engine E is automatically stopped when predetermined conditions are satisfied. The phrase "idle-stop" can be considered as referring to a control operation in which the idling rotation of engine E is stopped when predetermined conditions are satisfied to suppress the fuel consumption.

Similarly to the engine ECU 11, the transmission ECU 4 can comprise a microcomputer etc. and can be electrically connected to the engine ECU 11 for transmitting and receiving electric signals therebetween as well as electrically connected to actuators of the transmission 1 and the clutch K. As shown in FIG. 1, the transmission ECU 4 is formed of a gear ratio control device 5 (which can serve as a gear ratio control means) configured to control the transmission 1, a driver's demand judgment device 6 (which can serve as a driver's demand judgment means) and a target deceleration setting device 7 (which can serve as a target deceleration setting mean). In this case, the clutch control means for controlling the clutch K can be combined with the transmission ECU 4.

In addition, the gradient detection sensor 9 (which can serve as a gradient detection means) can be configured to detect the gradient of the vehicle during travel and can be connected to the transmission ECU 4. The gradient detecting means 9 may be formed of means for detecting the gradient by a control (operation etc.) described later or an inclination sensor for detecting the inclination angle of vehicle and detecting the gradient of vehicle during travel from the detected inclination angle. When detecting the gradient by operation etc., the gradient detecting means 9 can be arranged within the transmission ECU 4 or the engine ECU 11.

The driver's demand judgment means 6 of the present embodiment can be configured to judge or determine a target deceleration of the vehicle demanded by a driver in accordance with operation conditions of the first brake means 2 and the second brake means 3 and is structured so that it can control the vehicle on the basis of deceleration judged by the driver's demand judgment means 6 (more particularly, so that the target deceleration is set by the target deceleration setting means 7 on the basis of the deceleration judged by results of gradient detection and driver's demand judgment means 6 and the vehicle operates with the target deceleration set by the target deceleration setting means 7).

The target deceleration setting means 7 can set the target deceleration on the basis of the deceleration judged by the driver's demand judgment means 6 and is structured in the present embodiment so that the vehicle is controlled to obtain target deceleration set by the target deceleration setting means 7 by controlling the gear ratio of the transmission 1 as shown in FIG. 3. In this case, the means and method to obtain the target deceleration set by the target deceleration setting means 7 are not limited to those of controlling the gear ratio of the transmission 1 but may be those for example of adjusting intake resistance by changing the throttle opening during fuel cut of the engine, of adjusting power regeneration amount (regeneration amount during braking) of a motor of a hybrid vehicle or those of combination thereof.

The target deceleration setting means 7 can be configured so that it sets the target deceleration larger when both the first brake means 2 and the second brake means 3 are operated than when either one of the first brake means 2 and the second brake means 3 is operated. For example, as shown in FIG. 3 the driver's demand judge (demand level) when both the first brake means 2 and the second brake means 3 are operated is set higher than that when the second brake means 3 is operated alone. Thus, the target deceleration setting means can be considered as being configured to set the target deceleration in proportion to the actuation of the first and second brake means 2, 3. This enables to more accurately judge the driver's demand and thus to set the deceleration more precisely to the driver's demand or request for braking or deceleration.

In addition, the target deceleration setting means 7 of the present embodiment can be configured and/or structured as shown in FIG. 3 so that it does not perform setting or update of the target deceleration when the operation time of the first brake means 2 or the second brake means 3 (period of time of continuous operation) is shorter than a predetermined time (T1, T2) and on the other hand it sets the target deceleration on the basis of the deceleration judged by the driver's demand judgment means 6 or increases the target deceleration when the operation time of the first brake means 2 or the second brake means 3 (period of time of continuous operation) is longer than a predetermined time (T1, T2).

Accordingly, it is possible to prevent the setting or update of the target deceleration during short-duration or short time operations (operation shorter than the predetermined time (T1, T2)) for example, when drivers perform a short time braking operation for controlling the attitude of the vehicle when trying to turn the vehicle to the left or right. This enables to more accurately judge the driver's demand and thus to prevent the deceleration from being adjusted to that different from the driver's demand.

As noted above, the first brake means 2 is for braking a front wheel and the second brake means 3 is for braking a rear wheel. Optionally, in some embodiments, the second predetermined time T2 (period of time to be compared with the continuous operation time of the first brake means 2 or the second brake means 3) is set so that the time for operating the second brake means 3 is longer than the first predetermined time T1 for operating the first brake means 2.

Since the short time braking operation performed as an opportunity of controlling the attitude of the vehicle for example when trying to turn the vehicle to the left or right is usually done for the second brake means 3 (for braking the rear wheel), it is possible to more accurately judge the driver's demand and thus to prevent the deceleration from being adjusted to that different from the driver's demand by making the second predetermined time T2 longer than the first predetermined time T1.

As shown in FIG. 3, the saddled vehicle is structured so that the target deceleration set by the target deceleration setting means 7 is maintained even after the operation of the first brake means 2 or the second brake means 3 is stopped. This makes it possible to continue engine braking so as to provide target deceleration even if the operation of the first brake means 2 or the second brake means 3 is stopped, for example, during travel on a long downgrade and thus possible to reduce the frequency of brake operation as well as to more firmly obtain the deceleration of driver's demand.

In addition, according to the some embodiments, the saddled vehicle is structured so that the target deceleration set by the target deceleration setting means 7 is invalidated upon accelerator operation and a control is then executed to cancel the target deceleration. This makes it possible for the driver to more easily terminate the target deceleration, for example, by operating the accelerator Ga, and thereby avoid the need for a separate dedicated operation means and separate special operation for terminating the deceleration and/or engine braking control.

Also according to some embodiments, since the saddled vehicle comprises a deceleration increase switch 8 for increasing the target deceleration set by the target deceleration setting means 7 subject to a switch operation when the accelerator operation is not performed during travel of the vehicle, it is possible to increase the deceleration by operating the deceleration increase switch 8 and to more suitably obtain the deceleration of driver's demand for example when the deceleration automatically set by the target deceleration setting means 7 is insufficient.

Further, according to some embodiments, since the saddled vehicle comprises the gradient detection means 9 for detecting a road gradient during travel of a vehicle and the target deceleration setting means 7 sets a reduced target deceleration as compared with a flat gradient when a gradient detected by the gradient detecting means 9 is a downgrade, it is possible to prevent the vehicle from being adjusted to a different deceleration from the driver's demand during travel on a downgrade road. That is, the target deceleration is set small during travel along a downgrade road and thus this makes it possible to make the deceleration correspond to the driver's demand when a large deceleration is not required in such a case of travelling on a relatively long and linear downgrade road.

Further according to some embodiments, since the target deceleration set by the target deceleration setting means 7 is set on the basis of a state in which braking by the first brake means 2 and second brake means 3 is not performed, it is possible to set a suitable target deceleration irrespective of degree of braking (magnitude of braking force) of the first brake means 2 or the second brake means 3. That is, since the target deceleration is achieved by controlling the gear ratio when both the first brake means 2 and second brake means 3 are brake "ON" so that the target deceleration can be achieved when both the brake means 2, 3 are brake "OFF", it is possible to automatically and accurately control the gear ratio even if the deceleration is varied by the braking operation.

In addition, in some embodiments, the target deceleration setting means 7 can be configured so that the setting or update of the target deceleration is not performed when the increasing deceleration by operation of the first brake means 2 or the second brake means 3 is smaller than a predetermined value (that is, the effect of braking is smaller than a predetermined value) and on the other hand, the setting or upgrade of the target deceleration is performed on the basis of the deceleration judged by the driver's demand judgment means 6 when the increasing deceleration by operation of the first brake means 2 or the second brake means 3 is larger than a predetermined value (that is, the effect of braking is larger than a predetermined value). This makes it possible to more accurately judge the driver's demand and thus to prevent the deceleration from being adjusted to that different from the driver's demand.

In the embodiment described above, it is preferable that the first brake means 2 is for braking a front wheel and the second brake means 3 is for braking a rear wheel and that said predetermined value (predetermined value to be compared with the increasing deceleration by operation of the first brake means 2 or the second brake means 3) is set so that the value for operating the second brake means 3 is smaller than that for operating the first brake means 2.

The weak braking operation performed as an opportunity of controlling the attitude of the vehicle for example when trying to turn the vehicle to the left or right is done using either one of the first brake means 2 (for the front wheel) and the second brake means 3 (for the rear wheel) without necessity of the setting or update of the target deceleration. Since the braking effect of the first brake means 2 is the more effective than that of the second brake means 3, it is possible to accurately judge the driver's demand and prevent the deceleration from being adjusted to a different deceleration from that of the driver's demand by setting the predetermined value of the second brake means 3 smaller than that of the first brake means 2.

Then, the control for detecting the road gradient now on travel according to the gradient detection means 9 of some embodiments is described below in the context of a process illustrated in the flowchart of FIG. 4.

Firstly, judgments whether the transmission range is set at "D" range by the transmission range operating means 10 (S1), whether the accelerator operation is detected (e.g., is the accelerator off?) (S2) and whether the vehicle speed is higher than the predetermined speed (S3) are performed. When the transmission range is not set at "D" range (i.e. it is set at "N" range), when the accelerator operation is detected (when the driver is twisting the accelerator grip Ga beyond its closed or idle-state position) and/or when the vehicle speed is not higher than the predetermined speed, the process proceeds to step S13 and it is judged that the road is flat.

On the other hand, when the "D" range has been set, when the accelerator operation is not being operated (when the accelerator grip Ga is at the closed or idle-state position), and when the vehicle speed is higher than the predetermined speed, the process proceeds to step S4, it is then determined whether the first brake means 2 has been operated (e.g., is the first brake means 2 off?) and whether the second brake means 3 has been operated (e.g., is the second brake means 3 off?) at step S5. When judged both the first and second brake means 2, 3 has not been operated, the process proceeds to step S6 and the reference deceleration (current gear ratio) is calculated by a map, for example, shown in FIG. 5(*a*).

Then, a current deceleration (a value calculated by subtracting a currently measured vehicle speed from a formerly measured vehicle speed) is calculated at step S7 and a comparative deceleration (a value calculated by subtracting the current deceleration obtained at S7 from the reference deceleration obtained at S6) is continuously calculated at S8. Then, it is judged at S9 whether the comparative deceleration is smaller than an uphill slope predetermined value (e.g. a predetermined value obtained from a map shown in FIG. 5(*b*)). When it is judged that the comparative deceleration is smaller than the uphill slope predetermined value, the process proceeds to S11 and judges that the roadway is an upgrade (uphill slope). When judged that the comparative deceleration is not smaller than the uphill predetermined value at S9, it is judged at S10 whether the comparative deceleration is larger than the downhill slope predetermined value (e.g. a predetermined value obtained from a map shown in FIG. 5(*b*)). When the road is judged to be sloped larger than the downhill slope predetermined value, the process then proceeds to S12 and the process judges the road is downgrade (downhill slope) and when the process judges the road is not larger than the downhill slope predetermined value, the process then proceeds to S13 and judges that the road is flat.

The control for the driver's demand judgment by the driver's demand judgment means 6 of the some embodiments is described below with reference to a flowchart of FIG. 6.

Firstly, judgments are made whether the transmission range is set at "D" range by the transmission range operating means 10 (S1), whether the accelerator operation is detected (e.g., is the accelerator off?) (S2) and whether the vehicle speed is higher than the predetermined speed (S3) are performed. When the transmission range is not set at "D" range (i.e. it is set at "N" range), when the accelerator operation is detected and/or when the vehicle speed is not higher than the predetermined speed, in all of these cases the process proceeds to step S11, S12 and S13 and the driver's demand is judged, using the identifiers BRAKE 1 (a parameter relating to presence or absence of operation of the first brake means 2), BRAKE 2 (a parameter relating to presence or absence of operation of the second brake means 3) and Fsw (a parameter relating to presence or absence of operation of the deceleration increase switch 8) as BRAKE 1=0, BRAKE 2=0, and Fsw=0 (in this case, there is no driver's demand for deceleration).

On the other hand, when the "D" range has been set, when the accelerator is not being operated and when the vehicle speed is higher than the predetermined speed, the process then proceeds to step S4 and it is judged whether the first brake means 2 has been operated (e.g., that the first brake means 2 has been on) longer than the predetermined period of time T1 (see FIG. 3). When it is judged that the first brake means 2 has been operated for a period of time longer than the predetermined period of time T1, BRAKE 1=1 is set (S5). When it is judged the first brake means 2 has not been operated longer than the predetermined period of time T1 at step S4 or when BRAKE 1=1 is set at step S5, the process then proceeds to step S6 and it is judged whether the second brake means 3 has been operated (e.g., that the second brake means 3 has been on) longer than the predetermined period of time T2 (see FIG. 3). When it is judged the second brake means 3 has been operated longer than the predetermined period of time T2, BRAKE 2=1 is set at step S7.

In addition, when it is judged the second brake means 3 has not been operated longer than the predetermined period of time T2 at step S6 or when BRAKE 2=1 is set at step S7, the process then proceeds to step S8 and it is judged whether the deceleration increase switch 8 has been operated twice (Fsw=2). When judged it has been operated twice the process then proceeds to step S14. On the other hand, when judged it has not been operated twice, the process then proceeds to step S9 and it is judged whether the deceleration increase switch 8 has been operated (i.e. operation from OFF to ON). When the deceleration increase switch 8 is operated from OFF to ON, the driver's demand judgment (BRAKE 1+BRAKE 2+Fsw) is performed at S14 after Fsw=Fsw+1 is set at step S10.

Then, the control for the driver's demand judgment by the driver's demand judgment means 6 of the other embodiment will be described with respect to a flowchart of FIG. 7.

First of all, judgments whether the transmission range has been set at "D" range by the transmission range operating means 10 (S1), whether the accelerator operation is detected (e.g., is the accelerator off?) (S2) and whether the vehicle speed has been higher than the predetermined speed (S3) are performed. When the transmission range has not been set at "D" range (i.e. it is set at "N" range), when the accelerator operation is detected and when the vehicle speed has not been higher than the predetermined speed, these all cases go to steps S11, S12 and S13 and the driver's demand is judged respectively as BRAKE 1=0, BRAKE 2=0, and Fsw=0 (in this case, there is no driver's demand for deceleration).

On the other hand, when the "D" range has been set, when the accelerator operation is not detected and when the vehicle speed is higher than the predetermined speed, the process proceeds to step S4 and it is judged whether the second brake means 3 has been operated (e.g., is the second brake means 3 on?). When it is determined that the second brake means 3 has not been operated, the process then proceeds to step S14 and it is judged whether the first brake means 2 has been operated (e.g., is the first brake means 2 on?). When it is judged that the first brake means 2 has been operated at step S14, it is judged whether the deceleration increased by the operation of the first brake means 2 is larger than a predetermined value A1 (S15). When the increase deceleration is larger than the predetermined value A1, BRAKE 1=1 is set at S16 and when judged the first brake means 2 has not been operated at step S14, the process then proceeds to step S17 and memorizes a current deceleration as a deceleration under state in which both the brakes are "OFF" for judging the increase deceleration during braking operation.

When it is judged the second brake means 3 has been operated at step S4, the process proceeds to step S5 and it is judged whether the first brake means 2 has been operated (e.g., is the first brake means 2 on?). When the first brake means 2 has not been operated, the process then proceeds to step S6 and it is judged whether the deceleration increased by operation of the second brake means 3 is larger than a predetermined value A2. When larger than the predetermined value A2, the process then proceeds to step S7 and BRAKE 2=1 is set at step S7.

Furthermore, when it is determined that the first brake means 2 has been operated at S5, the process then proceeds to step S18 and is judged whether the deceleration increased by operations of the first brake means 2 and the second brake means 3 is larger than a predetermined value A3. When the deceleration increase is larger than the predetermined value A3, the process then proceeds to step S19 and BRAKE 1=1 is set and then BRAKE 2=1 is set at step S20. After steps S16, S17, S7 and S20, it is judged whether the deceleration increase switch 8 has been operated twice (Fsw=2). When not operated twice, the process then proceeds to step S9 and judges whether the deceleration increase switch 8 has been operated ((i.e. operation from OFF to ON). When the deceleration increase switch 8 has been operated from OFF to ON, a driver's demand judgment (BRAKE 1+BRAKE 2+Fsw) is performed at step S21 after setting of Fsw=Fsw+1 at step S10. In this case, the predetermined value are set as an order A1>A2>A3 in accordance with difference in the braking effect so that presence or absence of the demand of deceleration can be judged from the increased deceleration by braking as a demand of a driver (see steps S15, S6 and S18). In any case when judged the increase deceleration is not larger than A1 at step S15, when judged the deceleration increased by the operation of the second brake means 3 is not larger than A2 at step S6 and when the increase deceleration is not larger than A3 at step S18, the process returns to step S8 and the controls described above are performed.

Then, a control for setting the target deceleration (the target deceleration and the target gear ratio in some embodiments) by the target deceleration setting means 7 of the present embodiment is described below with reference to the flowchart of FIG. 8.

Firstly, judgments whether the transmission range has been set at "D" range by the transmission range operating means 10 (S1), whether the accelerator operation is detected (e.g., is the accelerator off?) (S2) and whether the vehicle speed has been higher than the predetermined speed (S3) are performed. When the transmission range has not been set at "D" range (i.e. it is set at "N" range), when the accelerator operation is detected and when the vehicle speed has not been higher than the predetermined speed, these all go to step S12 and the target gear ratio is set by an automatic gear ratio control map shown in FIG. 9.

On the other hand, when the "D" range has been set, when the accelerator operation is not detected and when the vehicle speed has been higher than the predetermined speed, the process proceeds to step S4 and the target deceleration can be found on the basis of a target deceleration map. As shown in FIG. 11, the target deceleration map is different between cases of a flat road (FIG. 11(a)), an uphill slope (FIG. 11(b)) and a downhill road (FIG. 11(c)) and intended to be able to find the target deceleration on the basis of the road gradient, the driver's demand and the vehicle speed.

Then, the process proceeds to step S5 to judge whether a predetermined period of time has been passed from the beginning of the deceleration control after the target deceleration having been found at step S4. When the predetermined period of time has not been passed, the process proceeds to step S10 to find the target gear ratio (in this case an initial gear ratio for the target deceleration) from a map (initial gear ratio map for the target deceleration). As shown in FIG. 12, the initial gear ratio map for the target deceleration is different between cases of flat road (FIG. 12(a)), of uphill slope (FIG. 12(b)) and of downhill road (FIG. 12(c)) and intended to be able to find the initial gear ratio for the target deceleration on the basis of the road gradient, the target deceleration and the vehicle speed.

When the predetermined period of time has been passed from the start of the deceleration control at step S5, the process proceeds to step S6 to judge operation if the first brake means 2 or second brake means 3 has been operated (e.g., are the first brake means 2 and the second brake means 3 both off?). When none of the brake means 2 or 3 is operated, the process proceeds to step S7 to judge whether the deceleration caused by engine brake is larger than a value which is obtained by adding a preset minute value (Δdeceleration) to the target deceleration. When it is judged at step S7 that the deceleration caused by engine brake is larger than the value which is obtained by adding Δdeceleration to the target deceleration, it is judged this is excessive deceleration as shown in FIG. 10. Accordingly, the process proceeds to step S11 and the target gear ratio is determined as a value which is obtained by subtracting the preset minute value (Δgear ratio) from the current target gear ratio. When no brake operation is performed at step S6, the target gear ratio is not changed.

When it is judged at step S7 that the deceleration caused by engine brake is not larger than the value which is obtained by adding Δdeceleration to the target deceleration, the process proceeds to step S8 and judges whether the deceleration is smaller than the target deceleration. When it is judged the deceleration is not smaller than the target deceleration, it is judged this is moderate deceleration as shown in FIG. 10. Accordingly, the process proceeds to step S13 and performs a feedback control (FB control) based on the set target gear ratio. On the other hand, when it is judged the deceleration is smaller than the target deceleration at step S8, it is judged this is deficient deceleration as shown in FIG. 10. Accordingly, the process then proceeds to step S9 and the target gear ratio is determined as a value which is obtained by adding the preset minute value (Δgear ratio) to the current target gear ratio.

Example processes of setting the target deceleration and the target gear ratios by using the target deceleration setting means 7 of some embodiments are described below on the basis of a target deceleration map of FIG. 13 and an initial gear ratio map for the target deceleration of FIG. 14. For example, when performing the accelerator OFF (without brake operation) during travel at normal speed (about 50 km/h) on a flat road, the target deceleration (substantially deceleration=0) shown in FIG. 13(a) by a black round mark (•) is set. In order to achieve the target deceleration, the target gear ratio shown by the black round mark in FIG. 14(a) is selected as the initial gear ratio and a later feedback control (FB control) is performed. Then when the road condition is changed from flat to downhill slope, the target deceleration is changed to a slight acceleration shown by a white round mark (○) in FIG. 13(c). In order to achieve the target deceleration, the target gear ratio shown in FIG. 14(c) is changed from the black round mark to the white round mark and the later feedback control is performed.

Example processes of setting the target deceleration and the target gear ratios by using the target deceleration setting means 7 of some embodiments are described below with reference to a target deceleration map of FIG. 15 and an initial gear ratio map for the target deceleration of FIG. 16. For example, when the first brake means 2 and the second brake means 3 are operated during travel at normal speed (about 50 km/h) on a downhill slope with the accelerator OFF and without brake operation, it is judged the driver's demand is changed from 0 to 2 and the target deceleration shown by a black round mark in FIG. 15(c) is set as a white round mark (slight deceleration). In order to achieve the target deceleration, the target gear ratio shown in FIG. 16(c) is changed from the black round mark to the white round mark and the later feedback control is performed.

Another embodiment is described below with reference to FIGS. 17 and 18.

A saddled vehicle in accordance with some embodiments can include a two-wheeled vehicle driven by a driver sitting on a saddle seat and steering a bar handle and can comprise, as shown FIGS. 17 and 18, an engine E, a bar handle H, two operation means for performing a braking operation including a first brake means 2 and a second brake means 12, a stepwise transmission 1', a clutch K, an engine ECU 11 as an engine control means, a transmission ECU 4, and a gradient detection means 9. The same reference numerals are used in the description of the embodiment of FIGS. 17 and 18 as those used in the description of the embodiment of FIGS. 1 and 2 and thus a detailed description of the corresponding components and features is omitted.

In the two-wheeled vehicle of FIGS. 17 and 18, the second brake means 12 is configured to be operated by a driver's foot. The second brake means 12 comprises a foot brake operated by a foot of driver sitting on the saddled seat and the two-wheeled vehicle can be braked by a rear wheel brake (not shown) when the foot motion of a driver is detected by a brake operation detection sensor S2.

Similarly to the first embodiment, the transmission 1' and the clutch K are arranged on the power transmitting path from the engine E to the driving wheel D. The transmission 1' is stepwise transmission provided with a dog clutch which can be automatically shifted to a predetermined gear step in accordance with modes set by the transmission range operating means 10. The transmission 1' can be controlled by the gear ratio control means 5 and adapted to transmit the driving power of the engine E to the driving wheel D when it is set to the "D" range (1st gear⇔2nd gear⇔3rd gear ⇔4th gear automatic gear ratio control in this embodiment) and not to transmit the driving power of the engine E to the driving wheel D when it is set to the "N" range.

As shown in FIG. 18, the transmission ECU 4 is further electrically connected to the vehicle-speed sensor S7 and a shift-drum angle sensor S8 for detecting states (states of transmission and interruption of power) of the dog clutch of the transmission 1' to detect states of the vehicle speed and the dog clutch. A reference numeral S4 denotes an engine rotation sensor electrically connected to the engine ECU 11.

Similarly to the first embodiment, a driver's demand judgment means 6 of this embodiment can judge the deceleration of the vehicle demanded by a driver in accordance with operation conditions of the first brake means 2 and the second brake means 12 and is structured so that it can control the vehicle on the basis of deceleration judged by the driver's demand judgment means 6 (more particularly so that the target deceleration is set by the target deceleration setting means 7 on the basis of the deceleration judged by results of gradient detection and driver's demand judgment means 6 and the vehicle can have the target deceleration set by the target deceleration setting means 7).

The target deceleration setting means 7 can set the target deceleration on the basis of the deceleration judged by the driver's demand judgment means 6 and is structured, similarly to the first embodiment, so that the vehicle is controlled to obtain target deceleration set by the target deceleration setting means 7 by controlling the gear ratio of the transmission 1'. In this case, the means and method to obtain the target deceleration set by the target deceleration setting means 7 are not limited to those of controlling the gear ratio of the transmission 1' and may be those for example of adjusting intake resistance by changing the throttle opening during fuel cut of the engine, of adjusting power regeneration amount (regeneration amount during braking) of a motor of a hybrid vehicle or those of combination thereof.

According to the first and second embodiments, since the saddled vehicle comprises a driver's demand judgment means 6 for judging the deceleration of the vehicle demanded by the driver in accordance with operation conditions of the first brake means 2 and the second brake means (3, 12) and is able to control the vehicle on the basis of the deceleration judged by the driver's demand judgment means 6, it is possible to obtain the driver's deceleration demand more accurately by properly using operations of the first brake means 2 and the second brake means (3, 12) peculiar to the saddled vehicle as compared with two-wheeled vehicles provided with single brake means. In addition, since the driver's demand judgment means also judges the road gradient in operations of the first and second brake means, it is possible to further accurately obtain the driver's deceleration demand. Accordingly, it is possible to instantaneously apply the engine brake in accordance with driver's demand even if travelling under the automatic gear ratio control and also possible to dispense with a separate dedicate operation means and a separate special operation for applying the engine brake.

In addition, according to the first and second embodiments, since the saddled vehicle further comprises a target deceleration setting means 7 for setting a target deceleration on the basis of the deceleration judged by the driver's demand judgment means 6 to control the vehicle as having the target deceleration set by the target deceleration setting means 7, it is possible to have the deceleration along the driver's demand. Furthermore, since the vehicle is controlled to obtain target deceleration set by the target deceleration setting means 7 by controlling the gear ratio of the transmission (1, 1'), it is possible to more accurately and rapidly obtain the target deceleration with applying the engine brake.

Although it is described the saddled vehicle of the present embodiments, the present invention is not limited to the described and illustrated embodiments. Accordingly, it may be possible to apply engine brake by changing the gear ratio with judging the deceleration of the vehicle of driver's demand by the driver's demand judgment means 6 in accordance with operational conditions of the first and second brake means without using the target deceleration setting means 7. In addition, the first brake means 2 is not limited to the operation means arranged at a tip end of the bar handle H to which the throttle grip Ga is mounted. Furthermore, the saddled vehicle of the present invention is not limited to the described and illustrated two-wheeled vehicle and thus may be applied to any other types of vehicles such as those driven by a driver sitting on a saddled seat and steered by a bar handle.

The present inventions can be applied to other saddled vehicles having different appearances and other functions than those described in this application if they are saddled vehicles comprising a driver's demand judgment means for judging the deceleration of the vehicle demanded by the driver in accordance with operation conditions of the first brake means and the second brake means, and a deceleration adjustment means is able to control the vehicle on the basis of the deceleration judged by the driver's demand judgment means.

What is claimed is:

1. A saddled vehicle driven by a driver sitting on a saddle seat and steering with a bar handle, comprising:
    a bar handle with first and second ends including, respectively, a grasping grip to be grasped by a driver and a throttle grip for an accelerator operation;
    a first brake means and a second brake means including two operation means for performing braking operations, at least one of which being mounted on the first or second end of the bar handle;
    a gradient detection means for detecting a road gradient during travel of the saddled vehicle; and
    a deceleration adjustment means for automatically adjusting the deceleration of the saddled vehicle in accordance with the road gradient detected by the gradient detection means, characterized in:
        that the saddled vehicle further comprises a driver's demand judgment means for judging the deceleration of the vehicle demanded by the driver in accordance with operation conditions of the first brake means and the second brake means and the road gradient detected by the gradient detection means; and
        that the deceleration adjustment means is able to control the vehicle on the basis of the deceleration judged by the driver's demand judgment means.

2. A saddled vehicle of claim 1, wherein the saddled vehicle further comprises a target deceleration setting means for setting a target deceleration on the basis of the deceleration judged by the driver's demand judgment means to control the vehicle as having the target deceleration set by the target deceleration setting means.

3. A saddled vehicle of claim 2, wherein the target deceleration setting means sets the target deceleration larger when both the first brake means and the second brake means are operated than when only one of the first brake means and the second brake means is operated.

4. A saddled vehicle of claim 2, wherein the target deceleration setting means does not perform setting or update of the target deceleration when an operation time of the first brake means or the second brake means is shorter than a predetermined time and performs setting of the target deceleration or increase of the set target deceleration on the basis of the deceleration judged by the driver's demand judgment means when an operation time of the first brake means or the second brake means is longer than the predetermined time.

5. A saddled vehicle of claim 4, wherein the first brake means is for braking a front wheel of the saddled vehicle and the second brake means is for braking a rear wheel of the saddled vehicle, and wherein said predetermined time comprises a second predetermined time for operating the second brake means that is longer than a first predetermined time for operating the first brake means.

6. A saddled vehicle of claim 2, wherein the target deceleration setting means does not perform setting or update of the target deceleration when the deceleration increased by the operation of the first brake means or the second brake means is smaller than a predetermined value and performs setting of the target deceleration or increase of the set target deceleration on the basis of the deceleration judged by the driver's demand judgment means when the deceleration increased by the operation of the first brake means or the second brake means is larger than the predetermined value.

7. A saddled vehicle of claim 6, wherein the first brake means is for braking a front wheel of the saddled vehicle and the second brake means is for braking a rear wheel of the saddled vehicle, and wherein said predetermined value comprises a second predetermined value that is smaller than a first predetermined value for operating the first brake means.

8. A saddled vehicle of claim 2, further comprising a deceleration increase switch configured to increase the target deceleration set by the target deceleration setting means subject to a switch operation of the deceleration increase switch when the accelerator operation is not performed during travel of the vehicle.

9. A saddled vehicle of claim 2, wherein the target deceleration set by the target deceleration setting means is invalidated when the accelerator is operated and a control based on the target deceleration is cancelled.

10. A saddled vehicle of claim 2, wherein the target deceleration set by the target deceleration setting means is maintained even if the operation of the first brake means or the second brake means is stopped.

11. A saddled vehicle of claim 2, wherein the target deceleration setting means sets a reduced target deceleration when a gradient detected by the gradient detecting means is a downgrade.

12. A saddled vehicle of claim 2, wherein the vehicle is controlled so as to have the target deceleration set by the target deceleration setting means by controlling the gear ratio of a transmission of the vehicle.

13. A saddled vehicle of claim 2, wherein the target deceleration to be set by the target deceleration setting means is set on the basis of a condition in which braking due to both the first brake means and the second brake means has not been performed.

14. A saddled vehicle driven by a driver sitting on a saddle seat and steering with a bar handle, comprising:
    a bar handle with first and second ends including, respectively, a grasping grip configured to be grasped by a driver and a throttle grip twistably mounted to the bar handle;
    a first brake input member and a second brake input member configured to allow a user to operate first and second braking devices of the saddled vehicle, respectively, at least the first brake input member being mounted on the first end of the bar handle;
    a gradient detection sensor configured to detect a road gradient of a road over which the saddled vehicle travels during operation; and
    a deceleration adjustment device configured to adjust a deceleration of the saddled vehicle in accordance with the road gradient detected by the gradient detection sensor; and
    a driver's demand judgment device configured to determine a request for deceleration of the vehicle from the driver based on operation conditions of the first and second brake input members and the road gradient detected by the gradient detection sensor;

wherein the deceleration adjustment device controls the vehicle on the basis of a determination by the driver's demand judgment device.

15. A saddled vehicle of claim 14, wherein the saddled vehicle further comprises a target deceleration setting device configured to set a target deceleration on the basis of the deceleration determined by the driver's demand judgment device.

16. A saddled vehicle of claim 15, wherein the target deceleration setting device is configured to set the target deceleration larger when both the first brake input member and the second brake input member are operated than when only one of the first brake input member and the second brake input member is operated.

17. A saddled vehicle of claim 15, wherein the target deceleration setting device is configured to not perform setting or update of the target deceleration when an operation time of the first brake input member or the second brake input member is shorter than a predetermined time and is configured to perform setting of the target deceleration or increase of the set target deceleration on the basis of the deceleration judged by the driver's demand judgment device when an operation time of the first brake input member or the second brake input member is longer than the predetermined time.

18. A saddled vehicle of claim 17, wherein the first brake input member is configured to operate a front wheel brake of the saddled vehicle and the second brake input member is configured to operate a rear wheel brake of the saddled vehicle, and wherein said predetermined time comprises a second predetermined time for operating the second brake input member that is longer than a first predetermined time for operating the first brake input member.

19. A saddled vehicle of claim 14, wherein the deceleration adjustment device is configured to adjust a deceleration of the saddled vehicle by controlling a gear ratio of a transmission of the vehicle.

* * * * *